US011869275B1

(12) United States Patent
Joseph

(10) Patent No.: US 11,869,275 B1
(45) Date of Patent: Jan. 9, 2024

(54) SYSTEMS AND METHODS FOR IMAGE ANALYSIS USING FACIAL CHARACTERISTICS

(71) Applicant: Michael G. Joseph, Stratford, CT (US)

(72) Inventor: Michael G. Joseph, Stratford, CT (US)

( * ) Notice: Subject to any disclaimer, the term of this patent is extended or adjusted under 35 U.S.C. 154(b) by 0 days.

(21) Appl. No.: 18/308,444

(22) Filed: Apr. 27, 2023

Related U.S. Application Data

(60) Provisional application No. 63/343,422, filed on May 18, 2022.

(51) Int. Cl.
  *G06T 5/20* (2006.01)
  *G06V 40/16* (2022.01)
  *G06V 10/74* (2022.01)

(52) U.S. Cl.
  CPC .............. *G06V 40/172* (2022.01); *G06T 5/20* (2013.01); *G06V 10/761* (2022.01); *G06V 40/171* (2022.01); *G06T 2207/20084* (2013.01); *G06T 2207/30201* (2013.01)

(58) Field of Classification Search
  CPC ... G06V 40/171; G06V 40/172; G06V 10/761
  See application file for complete search history.

(56) References Cited

U.S. PATENT DOCUMENTS

2023/0074293 A1\* 3/2023 Ivanovic ............... B60W 40/04

OTHER PUBLICATIONS

Best-Rowden et al., "Unconstrained Face Recognition: Identifying a Person of Interest From a Media Collection", IEEE Transactions on Information Forensics and Security, vol. 9, No. 12, pp. 2144-2157, Dec. 2014.
Chen, et al., "Pose-and-illumination-invariant face representation via a triplet-loss trained deep reconstruction model", Multimedia Tools and Applications, vol. 76, No. 21, 2017, pp. 22043-22058.
Chowdhury et al., "Face Recognition from Non-frontal Image Using Deep Neural Network", 2017, Ninth International Conference on Advances, Pattern Recognition (ICAPR), IEEE, 2017, pp. 1-6.
Creswell et al., "Generative Adversarial Networks: An Overview", arXiv:1710.07035v1 [cs.CV] Oct. 19, 2017, 14 pages.
Ding et al., "Multi-task pose-invariant face recognition", IEEE Transactions on Image Processing, vol. 24, No. 3, 2015, pp. 980-993.

(Continued)

*Primary Examiner* — Sam Bhattacharya
(74) *Attorney, Agent, or Firm* — Cooley LLP

(57) ABSTRACT

A first image showing a non-frontal view is received. CNN outputs generated based on the first image are concatenated to generate a concatenated CNN output. The concatenated CNN output is input to a first encoder to generate a first value for a first statistical property and a first value for a second statistical property. Configural information is generated based on the first image. The configural information is input to a second encoder to generate a second value for the first statistical property and a second value for the second statistical property. Vectors are generated based on the first and second values for the first statistical property, and the first and second values for the second statistical property. A latent vector is generated based on the vectors. The latent vector is input to a decoder to generate a second image showing a frontal view.

21 Claims, 30 Drawing Sheets

(56) References Cited

OTHER PUBLICATIONS

Goodfellow et al., "Generative adversarial nets", Advances in neural information processing systems, arxiv:1406.2661v1 [stat. ML] Jun. 10, 2014, pp. 1-9.
Gross et al., "CMU multi-pose, illumination, and expression (Multi-PIE) face database", CMU Robotics Institute. TR-07-08, Tech. Rep, 2007, 22 pages.
Hassner et al., "Effective face frontalization in unconstrained images", Proceedings of the IEEE conference on computer vision and pattern recognition, 2015, pp. 4295-4304.
Hoffer, et al., "Deep metric learning using triplet network", International Workshop on Similarity-Based Pattern Recognition, arXiv:1412.6622v1 [cs.LG] Dec. 20, 2014, 8 pages.
Huang et al., "Beyond face rotation: Global and local perception gan for photorealistic and identity preserving frontal view synthesis", in Proceedings of the IEEE international conference on computer vision, 2017, pp. 2439-2448.
Huang et al., "Labeled faces in the wild: Updates and new reporting procedures", Dept. Comput. Sci., Univ. Massachusetts Amherst, Amherst, MA, USA, Tech. Rep, vol. 14, No. 003, 2014, 5 pages.
Joseph et al., "Beyond Frontal Face Recognition", IEEE Access, vol. 11, pp. 26850-26861, Mar. 17, 2023, doi: 10.1109/ACCESS.2023.3258444.
Joseph et al., "Digit Recognition Based on Specialization, Decomposition and Holistic Processing. Machine Learning and Knowledge Extraction", 2020; 2(3): 271-282. https://doi.org/10.3390/make2030015.
Joseph Michael G., "Exploring the Efficiency of Face Recognition Learning Models and Specialization Decomposition and Holistic Processing", Dissertation submitted in partial fulfilment of the requirements for the Degree of Doctor of Philosophy in Computer Science and Engineering the School of Engineering University of Bridgeport Connecticut, Non-public draft created Feb. 2022; Date of first publication Apr. 28, 2022, 72 pages.
Kan et al., "Stacked progressive auto-encoders (spae) for face recognition across poses", Proceedings of the IEEE conference on computer vision and pattern recognition, 2014, pp. 1-8.
King, D.E., "DLib-ml: A machine learning toolkit", The Journal of Machine Learning Research, vol. 10, 2009, pp. 1755-1758.
Kingma et al., "Auto-Encoding Variational Bayes", arXiv:1312.6114v1 [stat.ML] Dec. 20, 2013, 9 pages.
Koch et al., "Siamese neural networks for one-shot image recognition", ICML deep learning workshop, vol. 2, 2015, 8 pages.
Lecun et al., "The MNIST database of handwritten digits", 1998, http://yann.lecun.com/exdb/mnist, vol. 10, 1998, 8 pages.
Liao et al., "A benchmark study of large-scale unconstrained face recognition", IEEE international joint conference on biometrics, IEEE, 2014, pp. 1-8.
Parkhi et al., "Deep face recognition", 2015, Proceedings of the British Machine Vision Conference (BMVC), BMVA Press, Sep. 2015, pp. 1-12.
Ranzato et al., "Unsupervised learning of invariant feature hierarchies with applications to object recognition", 2007 IEEE conference on computer vision and pattern recognition, IEEE, 2007, pp. 1-8.
Schroff et al., "Facenet: A unified embedding for face recognition and clustering", Proceedings of the IEEE conference on computer vision and pattern recognition, 2015, pp. 815-823.
Sengupta et al., "Frontal to profile face verification in the wild", 2016, IEEE Winter Conference on Applications of Computer Vision (WACV), 2016, pp. 1-9.
Sun et al., "Hybrid deep learning for face verification", Proceedings of the IEEE international conference on computer vision, 2013, pp. 1489-1496.
Taherkhani et al. "PF-cpGAN: Profile to frontal coupled GAN for face recognition in the wild," in 2020 IEEE International Joint Conference on Biometrics (IJCB), arxiv:2005.02166v1 [cs.CV] Apr. 25, 2020, pp. 1-10.
Taigman et al. "Deepface: Closing the gap to human-level performance in face verification", Proceedings of the IEEE conference on computer vision and pattern recognition, 2014, pp. 1-8.
Tran et al., "Disentangled representation learning gan for pose-invariant face recognition", Proceedings of the IEEE conference on computer vision and pattern recognition, 2017, pp. 1415-1424.
Yim et al., "Rotating your face using multi-task deep neural network", Proceedings of the IEEE Conference on Computer Vision and Pattern Recognition, 2015, pp. 676-684.
Zhang et al., "Joint face detection and alignment using multi-task cascaded convolutional networks", IEEE Signal Processing Letters, 2015, 5 pages.
Zhao et al., "Towards pose invariant face recognition in the wild", Proceedings of the IEEE conference on computer vision and pattern recognition, 2018, pp. 2207-2216.
Zhu et al., "Deep learning identity-preserving face space", Proceedings of the IEEE International Conference on Computer Vision, 2013, pp. 113-120.
Zhu et al., "High-fidelity pose and expression normalization for face recognition in the wild", Proceedings of the IEEE conference on computer vision and pattern recognition, 2015, pp. 787-796.
Zhu et al., "Multi-view perceptron: a deep model for learning face identity and view representations", in Advances in Neural Information Processing Systems, 2014, pp. 1-9.
Zhu et al., "Recover canonical-view faces in the wild with deep neural networks", https://doi.org/10.48550/arXiv.1404.3543, 2014, 10 pages.
Zhuang et al., "FT-GAN: face transformation with key points alignment or pose-invariant face recognition", Electronics, vol. 8, No. 7, p. 807, 2019, pp. 1-13.

* cited by examiner

|              | Model 0 | Model 1 | Model 2 | Model 3 | Model 4 | Model 5 | Model 6 | Model 7 | Model 8 | Model 9 | Overall |
|---|---|---|---|---|---|---|---|---|---|---|---|
| Similar Digits | 980 | 1135 | 1032 | 1010 | 982 | 892 | 958 | 1028 | 974 | 1009 | 10000 |
| Dissimilar Digits | 9020 | 8865 | 8968 | 8990 | 9018 | 9108 | 9042 | 8972 | 9026 | 8991 | 90000 |
| False Negative | 0 | 0 | 0 | 7 | 9 | 6 | 7 | 6 | 5 | 10 | 0.50% |
| False Positive | 6 | 8 | 16 | 8 | 7 | 12 | 10 | 10 | 13 | 13 | 0.11% |
| Accuracy % | 99.94% | 99.92% | 99.84% | 99.85% | 99.84% | 99.82% | 99.83% | 99.84% | 99.82% | 99.77% | 99.85% |

FIG. 10

Holistic model recognition rates (%) on the Multi-PIE dataset, compared with two classical models @Rank-1

|  | 100 Subjects | 200 Subjects |
|---|---|---|
| Baseline (B Model) | 92.77% | 96.67% |
| B + CI | 98.3% | 97.68% |
| B + CI + H + Classifier (Proposed) | 99.5% | 99.61% |

Best results are in bold

FIG. 17

Holistic model recognition rates (%) for the Multi-PIE dataset, compared with several known classical models @Rank-1

| | Dataset | Data set size | Accuracy % |
|---|---|---|---|
| Facenet, 2015 [38] | LFW | 260M images of 8M subjects, private | 99.63% |
| Wen et al. 2016 [65] | LFW | 0.7M images of 17,189 subjects | 99.28% |
| DeepID-2+, 2015 [66] | LFW | 290k face images of 12,000 subjects | 99.47% |
| Baidu, 2015 [67] | LFW | 1.9M images | 99.77% |
| ArcFace, 2019 [68] | LFW | 1M images | 99.83% |
| Chowdhury et.al. 2017, [45] | CMU-PIE | 43.1k images 68 subjects | 99.30% |
| Yin et al., 2017 [69] | Multi-PIE | 0.7M images of 337 subjects | 91.27% |
| PoseFace, 2021 [70] | Multi-PIE | 0.7M images of 337 subjects | 97.47% |
| Mollahosseini et al., 2016 [71] | Multi-PIE | 204k images | 94.70% |
| Chen et al., 2017 [46] | Multi-PIE | 111.7k images of 200 subjects | 83.80% |
| Proposed Model | Multi-PIE | 104k images of 200 subjects | 99.61% | result is in bold

FIG. 18

Holistic and classical models recognition rates (%) for the LFW dataset @Rank-1

| | 100 Subjects, 15 images per subject |
|---|---|
| Baseline (B Model) | 70.33% |
| B + Cl | 67.67% |
| B + Cl + H + Classifier (Proposed) | 70.00% |

Best result in bold

Receive a first image showing a non-frontal view of a face of a user 2102

Input the first image into each convolutional neural network (CNN) from a plurality of CNNs to generate a plurality of CNN outputs 2104

Concatenate the CNN outputs from the plurality of CNN outputs to generate a concatenated CNN output 2106

Input the concatenated CNN output to a first encoder that comprises a first fully connected neural network with a plurality of layers to generate a first value for a first statistical property and a first value for a second statistical property 2108

Generate configural information based on the first image, the configuration information indicating a set of distances associated with a set of facial landmarks of the face 2110

Input the configural information to a second encoder that comprises a second fully connected neural network with a plurality of layers to generate a second value for the first statistical property and a second value for the second statistical property 2112

Generate a first vector based on the first value for the first statistical property and the second value for the first statistical property 2114

Generate a second vector based on the first value for the second statistical property and the second value for the second statistical property 2116

Generate a latent vector based on the first vector and the second vector 2118

Input the latent vector to a decoder that comprises a third plurality of fully connected neural networks to generate a second image showing a frontal view of the face of the user 2120

FIG. 21

Continuing from FIG. 22B

Generate a fifth image showing the front view of the face of the user, by inputting the second vector to the decoder network 2236

Determine that a similarity between the first image and fourth image is above a predetermined threshold 2238

Determine that a similarity between the first image and the fifth image is above the predetermined threshold 2240

In response to determining that (1) the similarity between the first image and the fourth image is above the predetermined threshold and (2) the similarity between the first image and the fifth image is above the predetermined threshold, grant the user request to access the secured resource 2242

FIG. 22C

CONVOLUTIONAL NEURAL NETWORKS (CNN) CONFIGURATION

| | CNN #1 | CNN #2 | CNN #3 |
|---|---|---|---|
| | Conv1 | Conv1 | Conv1 |
| Input Image Size | 128 x 128 | 128 x 128 | 128 x 128 |
| Kernel Size | 11 x 11 | 7 x 7 | 5 x 5 |
| Stride | 2 | 2 | 2 |
| Padding | Yes | Yes | Yes |
| Feature Maps | 24 | 24 | 24 |
| Max Pooling | 2 x 2 | 2 x 2 | 2 x 2 |
| | Conv2 | Conv2 | Conv2 |
| Input Image Size | 32 x 32 | 32 x 32 | 32 x 32 |
| Kernel Size | 11 x 11 | 7 x 7 | 5 x 5 |
| Stride | 1 | 1 | 1 |
| Padding | Yes | Yes | Yes |
| Feature Maps | 32 | 32 | 32 |
| Max Pooling | 2 x 2 | 2 x 2 | 2 x 2 |
| | Conv3 | Conv3 | Conv3 |
| Input Image Size | 16 x 16 | 16 x 16 | 16 x 16 |
| Kernel Size | 11 x 11 | 7 x 7 | 5 x 5 |
| Stride | 1 | 1 | 1 |
| Padding | No | No | No |
| Feature Maps | 48 | 48 | 48 |
| Max Pooling | None | 2 x 2 | 2 x 2 |

Configuration information for the 3 Convolutional Neural Networks, each with 3 convolution layers.

SYSTEMS AND METHODS FOR IMAGE ANALYSIS USING FACIAL CHARACTERISTICS

CROSS REFERENCE TO RELATED APPLICATIONS

This application claims priority to and the benefit of U.S. Provisional Patent Application No. 63/343,422, filed May 18, 2022 and titled "Face Recognition and Authentication System with Anti-Spoofing Process," the contents of which are incorporated by reference herein in their entirety.

FIELD

One or more embodiments are related to systems and methods for image analysis using facial characteristics.

BACKGROUND

Face recognition is a subject of research within the computer vision field, and the attention it receives is due in part to the complexity of the problem. Face recognition models can involve detecting a wide variety of intra-class variations such as pose variations, facial expressions, effects of aging, and natural occlusions occurring due to different illuminations. These variations are sometimes referred to, collectively, as pose-illumination-expression (PIE). Although some methods have been proposed for addressing the challenges posed by PIE, the performance of face recognition models remains less than desirable. Advancements in cognitive science have provided some insights into how humans can achieve high accuracy in identifying and discriminating among different faces and objects, such as how the brain uses the features in the face to perform face recognition. Since achieving human-level accuracy in face recognition can be desirable, ascertaining whether a computational model can mimic this approach is worth consideration.

SUMMARY

In some embodiments, a face recognition method includes receiving, at a processor, a first image showing a non-frontal view of a face of a user. The first image is input into each convolutional neural network (CNN) from a plurality of CNNs to generate a plurality of CNN outputs. The CNN outputs from the plurality of CNN outputs are concatenated, to generate a concatenated CNN output. The concatenated CNN output is input to a first encoder that includes a first fully connected neural network with a plurality of layers, to generate a first value for a first statistical property and a first value for a second statistical property. Configural information is generated based on the first image. The configural information includes an indication of a set of distances associated with a set of facial landmarks of the face. The configural information is input to a second encoder that includes a second fully connected neural network with a plurality of layers, to generate a second value for the first statistical property and a second value for the second statistical property. A first vector is generated, via the processor, based on the first value for the first statistical property and the second value for the first statistical property. A second vector is generated, via the processor, based on the first value for the second statistical property and the second value for the second statistical property. A latent vector is generated, via the processor, based on the first vector and the second vector. The latent vector is input to a decoder that includes a third plurality of fully connected neural networks, to generate a second image showing a frontal view of the face of the user.

BRIEF DESCRIPTION OF THE DRAWINGS

FIG. 10 shows example experimental results after testing multiple different models trained to recognize and reconstruct the values shown in FIG. 9.

FIG. 17 is a table showing results for two different sample sizes for three different models, according to some embodiments.

FIG. 18 is a table showing accuracy for various known models.

FIG. 19C is a table showing results for three models using a sample size consisting of 100 subjects.

FIG. 25 shows a table comparing three convolution neural networks that can be used, according to an embodiment.

DETAILED DESCRIPTION

Figure 1A:
FIG. 1A shows five different images (a)-(e) of a single person.
Figure 1B:
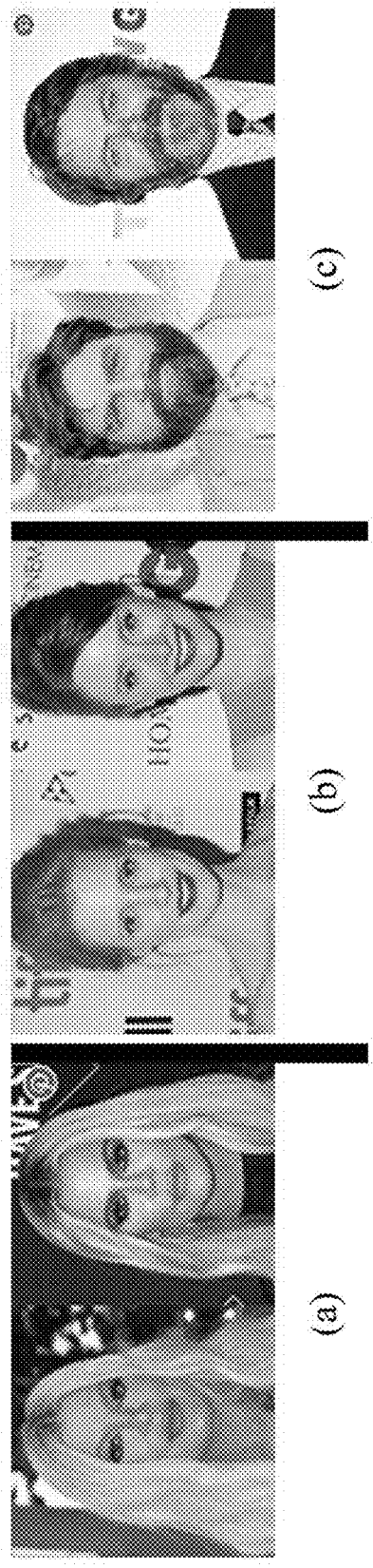
FIG. 1B shows image pairs, each image pair depicting two different people who look alike.

Within the field of object detection, some (non-face) objects are easier to recognize than faces because their variations may be limited to affine transformations, texture differences and color differences. Faces can have well-defined structured and symmetrical shapes, but be more complex to model than rigid objects because of differing pose variations, facial expressions, effects of aging, occlusions, and/or illumination variations. Additionally, intraclass variations such as differences in image background and scale, face poses and expressions, and age and illumination variances make establishing a correlation using pixel intensity levels between an input image and gallery images (e.g., ground truth data) difficult. For example, FIG. 1A shows five different images (a)-(e) of a single person (Arnold Schwarzenegger); as can be seen, images (a)-(e) all have variations with respect to one another, even though they all depict the same person. Moreover, interclass variations, or a lack thereof, can be challenging to account for because many faces have the same or overlapping characteristic features (e.g., two eyebrows, two eyes, a nose, and a mouth, all roughly in the same configuration, with eyes above nose, nose above the mouth, and so on). These interclass variations can impede the ability to discriminate between/among individuals (e.g., individuals within the same race). FIG. 1B illustrates examples of such interclass changes, where each of image pairs (a)-(c) shows two different people that look alike (image pair (a) shows Tori Spelling and Khloe Kardashian, image pair (b) shows Jessica Chastain and Bryce Dallas Howard, and image pair (c) shows Zach Galifanakis and Nick Offerman).

Known techniques have approached the foregoing problem in several ways. Some have developed complex, handcrafted algorithms that are not robust and that are difficult to maintain for large-scale recognition. Others focus on a Bayesian approach, 2D modeling, and 3D modeling. These known techniques are not without their flaws.

Figure 2:
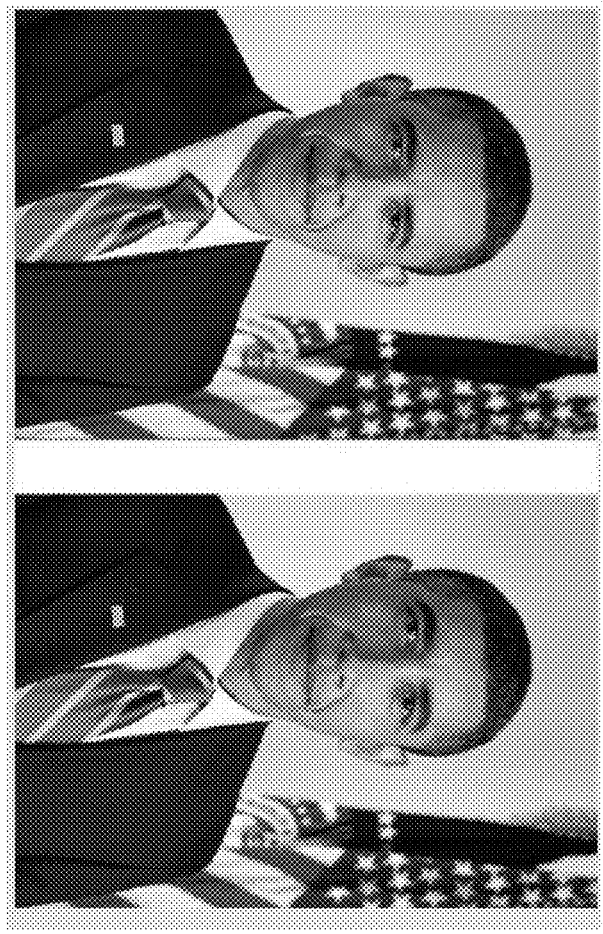
FIG. 2 shows an example of a face in an upside down/inverted, non-upright position.

Some say that the human ability to distinguish different faces with high accuracy is attributable to the fact that humans' visual processing systems rely on specialization and decomposition to perform face recognition. Regarding specialization, it was discovered through functional magnetic resonance imaging (fMRI) and face inversion experiments that there is a location within the human brain that responds only to face stimuli, and specifically face stimuli that is in a particular orientation—the upright position (FIG. 2, by contrast, shows an example of a face in an upside down/inverted, non-upright position). According to these experiments, there may be a reduction in a human's ability to accurately recognize faces when the incoming face stimulus is upside-down, a phenomenon known as the "face inversion effect" (note: this effect may be less pronounced with regard to the recognition of non-face objects). The face inversion effect may be evidence of a distinct neurologically localized module for perceiving faces in the upright position, which is different from some known visual pattern perception mechanisms used for identifying and recognizing other (non-face) objects. The observation that face inversion effect can be absent or less common in babies suggests that the brain specialization to process upright faces is learned over time/as a result of experience.

Regarding decomposition, the human face recognition process is sometimes decomposed into face detection and face recognition using three specific types of facial feature information:

1. First order information, which refers to the relative positioning of, for example, eyes with respect to nose, eyes with respect to mouth, eyes above nose, nose above mouth, etc. and which can be used during face detection.

2. Second order information, which refers to facial features such as the shape, color, and/or size of eyes, nose, mouth, etc., and which can be used during the recognition phase.

3. Configural information, which refers to features, sometimes used during the recognition phase, such as distance measurements calculated using the locations of facial features such as eyes, nose, mouth, etc. Configural information can sometimes be used to retrieve from memory a holistic representation of an individual to be identified.

In one example, a "holistic" representation refers to the simultaneous perception/parameterization of the multiple features of an individual face, which are integrated into, for example, a single global representation. Stated differently, a holistic representation can include a set of characteristics that services as a template for the entire face, where the facial features are not explicitly represented individually, but instead are represented in an integrated format. No consensus exists with regard to the content and structure of such holistic representations or their contribution to/impact on the inversion effect. For example, some are of the view that critical spatial relationships are represented and stored in human memory, while others believe that configural information as well as local information are encoded and stored in human memory. There is, however, some consensus on the human brain's ability to perceive and process faces as a coherent whole. There are some known experiments that provide evidence for holistic processing—namely with regard to "composite effect" and "part-whole effect" concepts. For example, with reference to the composite effect, some known experiments have shown that it can be difficult for human subjects to recognize that two identical top halves of a face are the same when they are paired with different bottom halves. With reference to the part-whole effect, some known experiments have shown that human subjects can have difficulty recognizing familiar faces based on isolated features of those faces.

In another known experiment, the configural information in faces was altered to the point of being grotesque (eyes placed closer to each other, shorter mouth-to-nose spatial relation, etc.). When those altered faces were presented in an inverted orientation, the distinctiveness impressions caused by the distorted configural information disappeared. It was found by that experiment that the human brain can recall from memory a holistic representation of the face that is free of distortion.

Biologically inspired neural networks have sometimes been shown to be more flexible than other known techniques, and in some instances have produced desirable results. These results, however, have primarily been for frontal face recognition, and when dealing with large pose variations (e.g., facial profiles over a +/−90° range), their accuracy diminishes. As such, efficient and robust profile face recognition remains a challenging problem.

Some embodiments of the present disclosure relate to a computational model that resembles the human brain approach to face recognition, discussed above, and use holistic processing and configural information (discussed further below) to address the aforementioned shortcomings of known face recognition techniques. Stated another way, some embodiments of the present disclosure are related to a computational model that closely mimics the way the human visual cortex performs face recognition. The computational model can, for example, decompose a recognition task into two specialized sub-tasks: a generator task (i.e., a task implemented by a "generator" that is implemented in software and/or hardware) that performs a holistic step, followed by a classifier task (i.e., a task implemented by a "classifier" that is implemented in software and/or hardware) for a recognition step, the generator and the classifier collectively referred to as a "holistic model." In some implementations, to effectively process one or more pose variations, calculated distance features referred to herein as configural information (CI) can be used to correlate imagery of a frontal view of a face of an individual with imagery of one or more profile views of the face of the individual (e.g., distance from eye to nose, distance from nose to mouth, etc.).

Some embodiments of the present disclosure are related to a model that can resemble or mimic the human visual cortex's face recognition process. For example, pre-processing such as illumination normalization, can be performed by a processor, in a manner inspired by/similar to the dilation of a human iris or the contraction of a human pupil to regulate the amount of light that reaches the retina.

Similar to the visual cortex, some implementations are related to a model that performs face recognition in two steps. First, a generator uses two types of features: the first type of feature is extracted by one or multiple Convolutional Neural Networks (CNN), and the second type of feature is calculated using the distance(s) between facial features (i.e., the configural information, as discussed further herein). The first and second features can then be fed to a variational auto encoder (VAE) to produce a holistic representation of the subject (e.g., the ground truth frontal face of the subject). The model can receive, as its input, imagery of a face in any pose from a plurality of poses and/or with any expression from a plurality of expressions, and transform the imagery into a holistic frontal representation of the face. Next, the recognition task may be carried out using a Neural Network (NN). In some instances, VAE can be used to implement the generator because of its ability to process faces holistically while learning a distribution of the target domain. Learning a distribution of the embedding can facilitate the recognition of previously unseen poses and facial expressions. Some benefits provided by embodiments of the present disclosure include: (1) development of a model architecture based on VAE, a non-deterministic model, that was engineered to make a deterministic prediction; (2) introduction and incorporation of configural information into a neural network model to correlate frontal view(s) with profile view(s) (e.g., left profile view, right profile view, front profile view, etc.); and (3) affirmation of the null hypothesis and demonstration of the superior capability of holistic models as contrasted with some known techniques.

In some implementations, during a facial recognition process and given an image of a face, discriminant features are extracted and used for classification. Approaches to face recognition can sometimes be categorized into engineered features and learning-based features.

Engineered Features

A holistic-based approach to face recognition can include extracting features from images. Perhaps the oldest holistic model is the Principal Component Analysis (PCA). In some instances, PCA is a statistics-based approach that creates an average or Eigenface based on a complete set of training images expressed in a reduced format or dimension. Recognition is performed by representing a sample input as a linear combination of basis vectors and comparing those basis vectors against the PCA model. PCA can operate holistically, without any regard to the "specific features of the face." PCA performance can suffer, however, under non-ideal conditions such as poor illumination, different backgrounds, affine transformations, and mixtures of profile and frontal face views. Some known techniques seek to rectify these shortcomings by attempting to integrate feature extraction in a manner that is explicit and invariant to affine transformation. Some such known methods include morphological operations (e.g., thresholding, opening, and closing), pre-engineered filters (e.g., scale-invariant feature transform (SIFT) and Haar-like features)), dynamically calculated filters using Hu transforms, and learned filters using Convolutional Neural Network.

Local Binary Pattern (LBP) is another statistical method, which uses a histogram to extract features. This method performs undesirably poorly in response to large variations. Local Discriminant Analysis (LDA) creates decision boundaries between the classes. LDA looks for the linear combination that best models a difference in the data. Because PIE can make intraclass variations larger than interclass variations, LDA uses large amounts of training data. Gabor filters are feature extractors, and are more robust to PIE because a set of Gabor filters with different frequencies, size and orientations can extract features that are invariant to scale and orientation.

The aforementioned known techniques do not, however, achieve sufficiently high accuracy for unconstrained face recognition because of the non-linearity that exists between different poses of the same individual. To deal with this, 3D-based methods have been actively researched. Some known methods capture 3D face data or estimate the 3D model of a face based on the 2D input in any pose. Once a correspondence is established, recognition involves comparing the landmarks with gallery face images. These 3D-based methods are somewhat more robust to different facial expressions and pose variations, however 3D data are often not easily accessible (e.g., sometimes requiring a laser to measure depth), estimating 3D models from 2D data is computationally expensive, and illumination variations pose problems for these models.

In general, many engineered features are limited to their design parameters and thus cannot be well generalized in many practical applications.

Learning-Based Models

Learning-based models are divided into two categories: (1) models that use enhanced architectures, complex loss functions and millions of training samples, and (2) models that attempt to address most of the issues related to face recognition simultaneously, i.e., with the goal of achieving high accuracy under any pose, illumination and facial expression while using holistic processing.

One known technique is related to a network named DeepFace, which had reportedly achieved an accuracy of 97.53% on the Labeled Face in the Wild (LFW) dataset.

DeepFace pre-processed input data by applying a 3D model algorithm and used 67 fiducial points to transform the input face into a cropped 2D-aligned canonical view. The network included 6 CNNs followed by a fully connected layer.

Another known technique is related to a network name FaceNet that had reportedly achieved an accuracy of 99.63% on the Labeled Face in the Wild (LFW) dataset. The network had 11 CNNs and 5 fully connected layers.

Another known technique is related to a CNN based network name VGG-Face, designed for face recognitions from an image or a set of frames from a video. The network was 16 layers deep (some are fully connected layers) and used a triplet loss function to optimize the network. It was tested on the LFW dataset and reported 98.95% accuracy. While the accuracy is less than FaceNet, it used fewer training data (2.6 million versus the 200 million used by FaceNet).

Another known technique is related to a deep CNN that can extract features from an image of arbitrary pose and use those features to reconstruct the individual in the frontal view (or canonical view) with neutral illumination. The training strategy included training the network in two steps. The first focused on parameter initialization while the second focused on parameter updating. The input, output and the label or ground truth were all images. The model applied pre-processing to handle illumination variances and alignment. This model suffered from a lack of stochasticity, which made it less flexible to handle large pose variation, which is evident on the reported accuracy. Noise was injected into the model in an attempt to address this shortcoming.

Another known technique is related to a deep learning framework that can recover the frontal view from a 2D image in any pose. The model applied pre-processing to normalize illumination. The network contained five CNNs, each of which took a pair of whole faces or facial components as input. Then output of all CNNs layers were concatenated and fed to a logistic regression that predicted whether the two face images belonged to the same identity.

Another known technique is related to a learning model based on encoder-decoder architecture. The model was tested on the handwritten dataset. The input, output and the ground truth are the same image. The latent vector was encoded using four binary numbers and the decoder reconstructed the input based on the latent vector.

Another known technique is related to a deep neural network that can generate an output face image at a specific pose while preserving input image identity. The input to the network is a face image with an arbitrary pose and illumination and a code specifying the desire output pose (e.g., 30 degrees).

Another known technique is related to a stacked progressive auto-encoders capable of learning pose-robust features and generating a frontal view from arbitrary poses. It does so in an incremental fashion. For example, to rotate an image from −30 degrees, the network would first rotate to −15 degrees, then to 0 degrees. As a result of performing the transformation in an incremental fashion, the outputs of the hidden layers allegedly learned pose-robust features for face recognition.

Another known technique addresses pose variance using an autoencoder to generate a template to represent all the poses in a class by a single entity. The template represented an image of a particular pose, and irrespective of the person, an average of all individual on that particular head-pose. The non-frontal templates were used to train a CNN to learn the frontal image of each person present in the training set.

Many of these known techniques make no use of explicitly calculated information that can guide the model, but instead attempted to deal with the problem of pose variations using holistic processing.

Many of these known techniques share a common approach with some implementations described herein, which is to transform the input of any pose and facial expression into a canonical frontal view to improve the recognition task. However, none of these known methods explicitly inject configural information into the network.

Figure 3:
FIG. 3 shows image pairs, each image pair including a cropped image and an associated non-cropped image.

In some embodiments, pre-processing may be performed prior to performing face recognition. For example, in some implementations, if a model accepts a specific image size, the face can be located and cropped to a predetermined size (e.g., to size of 128 by 128) using, for example, a technique such as DLib (see, e.g., D. E. King, "DLib-ml: A machine learning toolkit," The Journal of Machine Learning Research, vol. 10, 2009, pp. 1755-1758, the contents of which are incorporated by reference herein it their entirety) and/or multi-task cascaded convolutional networks (MTCCN) (see, e.g., K. Zhang, Z. Zhang, Z. Li, and Y. Qiao, "Joint face detection and alignment using multi-task cascaded convolutional networks," IEEE Signal Processing Letters, 2015, the contents of which are incorporated by reference herein in its entirety). For example, FIG. 3 shows three image pairs—(a) through (c). Image pair (a) includes an upper image prior to the face being cropped and a lower image after the face has been cropped. Similarly, image pair (b) includes an upper image prior to the face being cropped and a lower image after the face has been cropped, and image pair (c) includes an upper image prior to the face being cropped and a lower image after the face has been cropped. Cropping the image can remove unrelated information, which in turn can help the model to focus only on the face and reduce the effect of background noise. Facial features such as eyebrows, eyes, nose, mouth and chin locations can then be extracted and used to calculate configural information.

Figure 4:
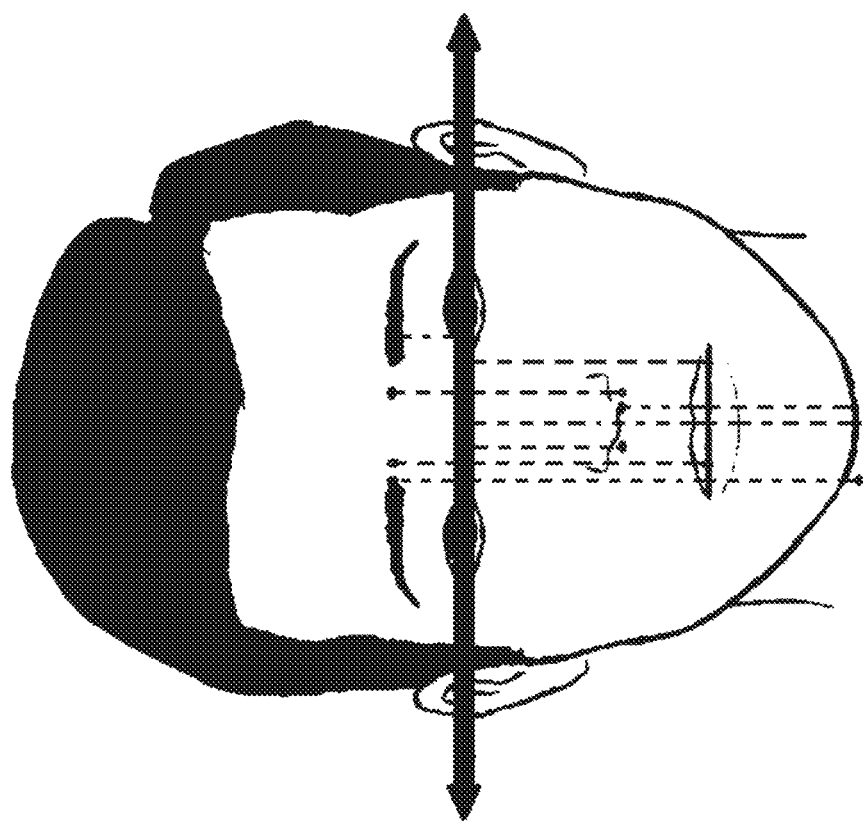
FIG. 4 shows representations of configural information, including representations of distances between various landmarks of a user's face, according to an embodiment.

In some implementations, "configural information" refers to information indicative of relationships between/among features (e.g., facial features), such as distances between/among the eyes and nose, nose and mouth and so on. In other words, configural information can be understood as information/data that conveys or represents a configuration of a face. For example, the lines at FIG. 4 show representations of configural information that includes distances between various landmarks of a user's face. The brain uses configural information to retrieve from memory the holistic representation of the target individual. Similarly, and according to some computer-implemented embodiments set forth herein, and using, by way of non-limiting example, DLib and MTCNN, the locations of eyebrows, eyes, nose, mouth, chin, and/or the like can be extracted. Configural information can then be calculated as the distance(s) between (1) eyes and eyebrow, (2) eyes and nose, (3) eyes and mouth, (4) eyes and chin, (5) nose and eyebrow, (6) nose and mouth, (7) nose and chin, (8) eyebrow and chin, and/or the like, in any combination/subset.

In some implementations, distances (1)-(4) are computed using the following equations:

With the two points of the eyes (x1, y1) and (x2, y2), draw a line using the equation of a line:

$$Ax+By+C=0$$

$$(y_2-y_1)x+(X_2-x_1)y+(x_1y_2-x_2y_1)=0$$

where $(y_2-y_1)=A$, $(x_2-x_1)=B$ and $(x_1y_2-x_2y_1)=C$

The distance to a third point ($x_3$, $y_3$) (e.g., eyebrow, nose, mouth, jaw, etc.) can be orthogonal to that line.

$$d = \frac{|Ax_3 + By_3 + C|}{\sqrt{A^2 + B^2}}$$

Distances (5)-(8) can be calculated using any of distances (1)-(4), as applicable. For example, (7) can be calculated by (4) minus (2).

Figure 5:
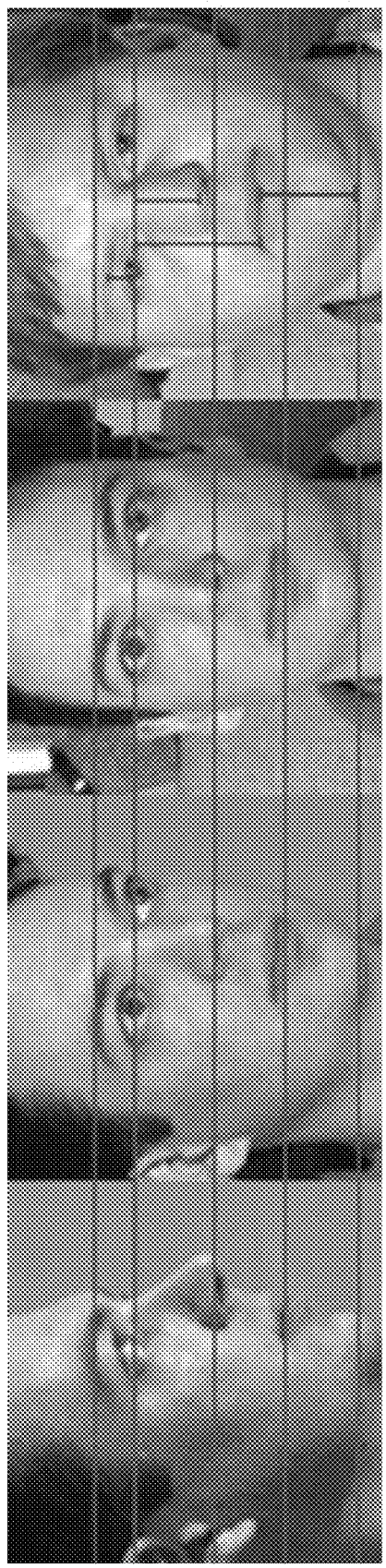
FIG. 5 shows configural information for two different users and for multiple different profile views of the first user, according to an embodiment.

In some implementations, configural information in addition to or instead of those described at (1)-(8) can be determined (e.g., distance between eyes or distance between nose and ear). In some implementations, only those distances that are invariant to roll and yaw orientation and/or that are least affected by different facial expressions are used as configural information (e.g., distances (1) through (8)). For example, as shown in FIG. 5, the distances (1) through (8) for the person shown in images (a) through (c) of FIG. 5 remain substantially the same (e.g., within +/−10% of each other) regardless of whether the picture depicts a frontal view, left view, or right view of that person, whereas the distances (1) through (8) can vary between persons (e.g., compare image (c) with image (d), which is of a different person). Therefore, distances (1) through (8) can provide to the model a desirable connection between frontal and profile faces as well as some discrimination between different subjects/persons/users.

In some implementations, calculated and/or measured configural information includes distances between features and is expressed in pixels. Configural information can therefore be normalized, for example, using a constant that is calculated based on the standard deviation in the training images. A small constant c is a constant (e.g., c=5 pixels) that can account for errors in face detection. Likewise, a random number (e.g., between −0.025 and +0.025) can be added to the configural information during training. Configural information, however, may not always be invariant to pitch transformations. For example, the face in image (b) of FIG. 1A has a slight downward pitch, which may result in a slightly different configural information than those without pitch. Therefore, in some implementations, as the pitch angle increases, the configural information values can go closer to/approach zero or be reduced.

Some implementations use variational autoencoders (VAEs). A VAE has an architecture similar to that of an autoencoder. Some autoencoders comprise an encoder that compresses the dimensionality of an input image and a decoder that decompresses or restores the input image. VAEs can encode the latent vector using a random but known distribution so that the network can learn a distribution of the domain, thus allowing it to generalize better. As used herein, a latent vector, in the context of VAEs, refers to a vector that is sampled from a distribution of inputs (e.g., an image). This vector is termed a "latent" distribution because this distribution outputs a compact (and hidden) representation of the inputs.

In some embodiments, the objective of a variational autoencoder is to identify a distribution $p_\phi$, (z|x) of some latent variables, so that new data can be sampled from it. Using Bayesian statistics, one obtains:

$$p(z|x) = \frac{p(x|z)p(z)}{p(x)}$$

$$p(x) = \int p(x|z)p(z)dz,$$

Given that the latent space, z, can be any dimension, the integral for each dimension would ideally be calculated, and as such, calculating p(x)—the marginal likelihood—is not tractable. If p(x) cannot be computed, neither can p(z|x).

Figure 6A:
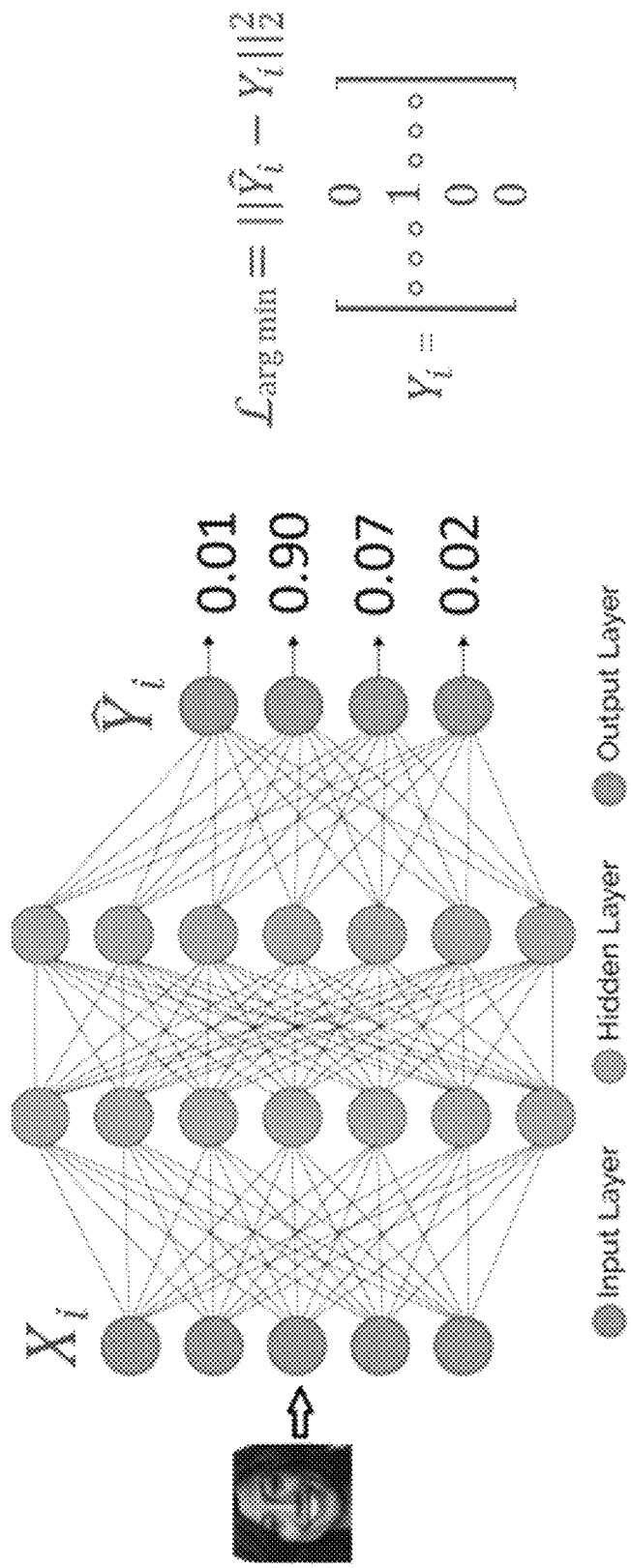
FIG. 6A shows an example of a known neural network architecture or classical model.
Figure 6B:
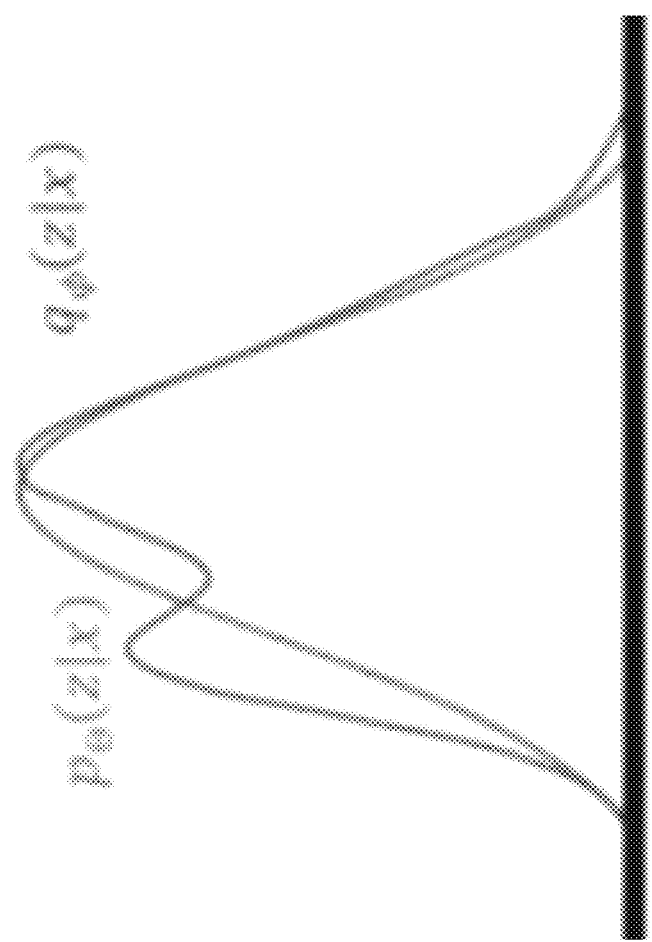
FIG. 6B illustrates a plot for finding a $\phi$ value that makes $q_\phi$ closest to $p_\theta$, according to an embodiment.

Instead, variational inference can be used to approximate this distribution. To find an approximation to the true intractable $p_\theta$(z|x), a known (tractable) distribution $q_\phi$(z|x) can be used and $p_\theta$(z|x) can be forced to follow this distribution without interfering with the reconstruction of the original image. In some implementations, an approach called "K-L divergent" can be used (see, e.g., D. P. Kingma and M. Welling, "Auto-Encoding Variational Bayes. 2013," arXiv preprint ArXiv:1312.6114., the contents of which are incorporated by reference herein in their entirety). K-L divergent is a method for measuring similar distributions. The goal is to find a value of 4) that makes q closest tope; a visual example of which is illustrated in FIG. 6B.

The formula for K-L divergent is:

$$D_{KL}[q(x)\|p(x)] = \sum q(x)\log\left(\frac{q(x)}{p(x)}\right)$$

By replacing p(x) and q(x) with conditional probabilities, the result is:

$$D_{KL}[q(z|x)\|p(z|x)] = \sum q(z|x)\log\left(\frac{q(z|x)}{p(z|x)}\right)$$

Using Bayes and log rules the result is:

$D_{KL}[Q_\phi(z|x)P_\theta(z|z) = \log p(x) - E_z[\log(P_\theta(x|z))] + D_{KL}[Q_\phi(z|x)\|P_\theta(z)]$ Since $D_{KL}$ is always positive:

$\text{Log } P(x) >= E_z[\log(P_\theta(x|z))] - D_{KL}[Q_\phi(z|x)\|P_\theta(z)]$ Therefore, by maximizing the term on the right-hand side (i.e., $E_z[\log(P_\theta(x|z))] - D_{KL}[Q_\phi(z|x)\|P_\theta(z)])$, the term on the left-hand side (i.e., Log P(x)) is also maximized. Thus, the right-hand side can be called the estimate likelihood lower bound (ELBO). Likewise, by minimizing $D_{KL}[Q_\phi(z|x)\|P_\theta(z)]$ (because of the minus sign), $E_z[\log(P_\theta(x|z))]$ is maximized.

$E(x) = \Sigma x\, p(x)$ where E is the expectation of a certain/predefined event occurring.

The loss function for a variational autoencoder can thus be:

$L(\theta,\phi)) = E\ z \sim Q_\phi(x|z)[\log(P_\theta(x|z)] + D_{KL}(Q_\phi(z|x)\|P_\theta(z))$ The first portion of this equation is the data fidelity term and the second portion of this equation is the K-L divergent.

To compute $D_{KL}[Q_\phi(z|x)\|P_\theta(z)]$, the unknown distribution can be estimated using a known distribution N (0, 1).

Supposing two multivariate normal distributions defined as:

$P(x) = N(x,\mu1,\varepsilon1)$ $Q(x) = N(x,\mu1,\varepsilon2),$ where $\mu1$ and $\mu2$ are means and $\varepsilon1$ and $\varepsilon2$ are the covariance matrixes or variances, the multivariate normal density distribution of dimension k can be defined as:

$$\mathcal{N}(x, u, \varepsilon) = \frac{1}{\sqrt{(2\pi)^k |\varepsilon|}} e^{-0.5(x-\mu)^T \varepsilon^{-1}(x-\mu)}$$

$$D_{KL}(p(x)\|q(x)) = 1/2 \left[ \log \frac{|\varepsilon_2|}{|\varepsilon_1|} - d + \operatorname{trace}(\varepsilon_2^{-1} \varepsilon_1^{-1}) + (\mu 2 - \mu 1)\varepsilon_2^{-1}(\mu 2 - \mu 1) \right]$$

If one of the distributions is set to be zero mean and unit variance, N(0, 1), then:

$$D_{KL}[\eta(\mu, \varepsilon) \| \eta(0, 1)] = \frac{1}{2} \sum_{j=1}^{J} \left( 1 + \log(\varepsilon^2) - \mu^2 - \varepsilon^2 \right)$$

To solve $$E\ z \sim Q_\phi(x|z)[\log(P_\theta(x|z)]$$

from $$L(\theta, \phi) = E\ z \sim Q_\phi(x|z)[\log(P_\theta(x|z)] + D_\phi(Q_\phi(z|x)\|P_\theta(z)),$$

re-parameterization can be used.

To minimize a loss function, the partial derivative can be taken with respect to one of the model parameters and set to zero. It can sometimes be difficult to take the derivative of this loss function with respect to φ, because the expectation is taken over the distribution which is dependent on φ. In such a case, re-parameterization can be used.

$$Ez \sim q_\phi, (x|z)[\log(P_\theta(x|z)] \equiv \frac{1}{L}\sum_{l=1}^{L} \log p_\phi(x|z^l)$$

By replacing the data fidelity term from $$L(\theta, \phi) = E\ z \sim Q_\phi(x|z)[\log(P_\theta(x|z)] + D_{KL}(Q_\phi(z|x)\|P_\theta(z))$$

with $$D_{KL}[\eta(\mu, \varepsilon) \| \eta(0, 1)] = \frac{1}{2} \sum_{j=1}^{J} \left( 1 + \log(\varepsilon^2) - \mu^2 - \varepsilon^2 \right)$$

and replacing the KL divergent term from $$L(\theta, \phi) = E\ z \sim Q_\phi(x|z)[\log(P_\theta(x|z)] + D_{KL}(Q_\phi(z|x)\|P_\theta(z))$$

with $$Ez \sim q_\phi(x|z)[\log(P_\theta(x|z)] \equiv \frac{1}{L}\sum_{l=1}^{L} \log p_\phi(x|z^l)$$

The VAE loss function can be $$L(\theta, \phi) = \frac{1}{L}\sum_{l=1}^{L} \log p_\phi(x|z^l) - \frac{1}{2}\sum_{j=1}^{J}\left(1 + \log(\varepsilon^2) - \mu^2 - \varepsilon^2\right)$$

To create a more fair and consistent experimental setting, three models were created for comparison purposes. Each model is different from each other model by only one variable. With all model parameters remaining constant, any difference in accuracy can be attributed to the variable that is different. The first is the baseline model (B Model), a known classical learning model. The second is the baseline model with the addition of configural information features (B+CI model). The third is the baseline model with configural information features and a holistic processing architecture (B+CI+H model), also referred to as the holistic model. The B Model and B+CI model are also referred to as classical models. Additional details related to the B Model, B+CI model, and holistic model are discussed at Joseph, Michael, and Khaled Elleithy. "IEEE Xplore Full-Text PDF:" Beyond Frontal Face Recognition, IEEE, 17 Mar. 2023, https://ieeexplore.ieee.org/stamp/stamp/jsp?tp=&arnumber=7169508., the contents of which are incorporated by reference herein in their entirety.

Some known classical models learn by extracting features from input(s) and optimizing the network using gradient descent. It is a process by which the derivative of a loss function is used to evaluate the difference between the network predicted output against the expected output and performs weights update as needed through backpropagation. The expected output vector (also referred to as a label) is usually a one-hot encoding vector where the correct class prediction is one, and all other values in the vector are zero. Even when the inputs are pair or triplets' images, such as in G. Koch, R. Zemel, and R. Salakhutdinov, "Siamese neural networks for one-shot image recognition," in ICML deep learning workshop, 2015, vol. 2: Lille. or E. Hoffer and N. Ailon, "Deep metric learning using triplet network," in International Workshop on Similarity-Based Pattern Recognition, Springer, 2015, pp. 84-92., features are extracted from each image separately, and the outputs are later optimized with a one-hot encoding vector. As a result, the embedding learned by the network loses some of the similarity information (see, e.g., Y. Sun, X. Wang, and X. Tang, "Hybrid deep learning for face verification," in Proceedings of the IEEE international conference on computer vision, 2013, pp. 1489-1496.). FIG. 6A shows an example of a known neural network architecture or classical model. The features extractor and the classifier are part of the same network. The loss function is minimized by the gradient descent algorithm. The error loss between Y^(e.g., the network prediction) and Y (e.g., the one-hot-encoding label) is computed and the network parameters Wi and bi, are updated at a specific learning rate.

According to some embodiments of the present disclosure, implementations of the holistic model differ from known models in at least two ways. First, the holistic model explicitly divides the recognition task into two subtasks: a learning task and a recognition task. The training labels for the generator can be images. One advantage of this approach is that the features extracted reflect the similarity in the target domain, and the internal representation is driven mainly by the data. This can improve the performance of the model on unseen data. Second, in addition to the features extracted by the CNNs, the model can use calculated features referred to as configural information.

The Baseline Model (B-Model)

In some embodiments, the B-model takes only one input, such as a 128 by 128 color image. The B-model can use convolution for feature extraction (e.g., the extraction of one or multiple features), followed by a fully connected network for class prediction. The entire architecture can be divided into three modules:

Module 1: The feature extractor can include, for example, three convolutional neural networks (CNNs) running in parallel without weight sharing. Each CNN uses a different kernel or filter size, such as, 11x11, 7x7, and 5x5, respectively. Each CNN can be three layers deep. Each layer can be composed of, for example, a convolution, followed by a 2x2 max pooling and a ReLU activation function. ReLU can be defined as f(x)=max(0, x). The feature maps output by each layer can be 24, 32, and 48, respectively.

Module 2: The output of the three CNNs can be flattened and concatenated into a one-dimensional vector.

Module 3: The vector can be fed to a fully connected neural network that is the classifier. The fully connected neural network can have three hidden layers, each with e.g., 4096, 2048, and 1024 neurons. Each hidden layer can use batch normalization and a non-linear function, such as a Hyperbolic Tangent function. The output layer can have the same number of neurons as classes. Lastly, an activation function (such as a Softmax activation function) can be applied to the output to represent a confidence level for each class prediction.

In some embodiments, the B-Model model can be a supervised learning model that uses one-hot encoding for ground truth specification (or labels) and minimizes the mean square error (MSE) between the model output and the expected output (the one-hot encoding label). Mean square error is also referred to herein as L2-norm.

The Hyperbolic Tangent function can be given by:

$$T(x) = \frac{e^x - e^{-x}}{e^x + e^{-x}}$$

The L2-norm can be given by:

$$\frac{1}{n}\sum_{k=0}^{n}|x - \hat{x}|^2$$

The Softmax function can be given by:

$$\bar{H}_{jk}(x) = \frac{e^{H_{jk}(x)}}{\sum_{l=1}^{N}(e^{H_{jl}(x)})}$$

where $x_{jk}$ is a j×k dimensional vector of the $j^{th}$ identity and the kth view. N=k is the number of classes in the multi-class classifier, H(x) denotes the output of the hidden layer, so H(x)=w x+b and $\bar{H}(\cdot)$ is the Softmax function.

B+CI Model

In some embodiments, the only difference between the baseline model (B-Model) and the B+CI model is the addition of the configural information. Therefore, the B+CI takes two inputs, such as a 128 by 128 color image and a vector that contains the configural information (e.g., eight distances between different facial landmarks). The configural information can be concatenated with the output of the CNNs (see module 2 described above).

Holistic Network (i.e., B+CI+H Model)

Figure 7:
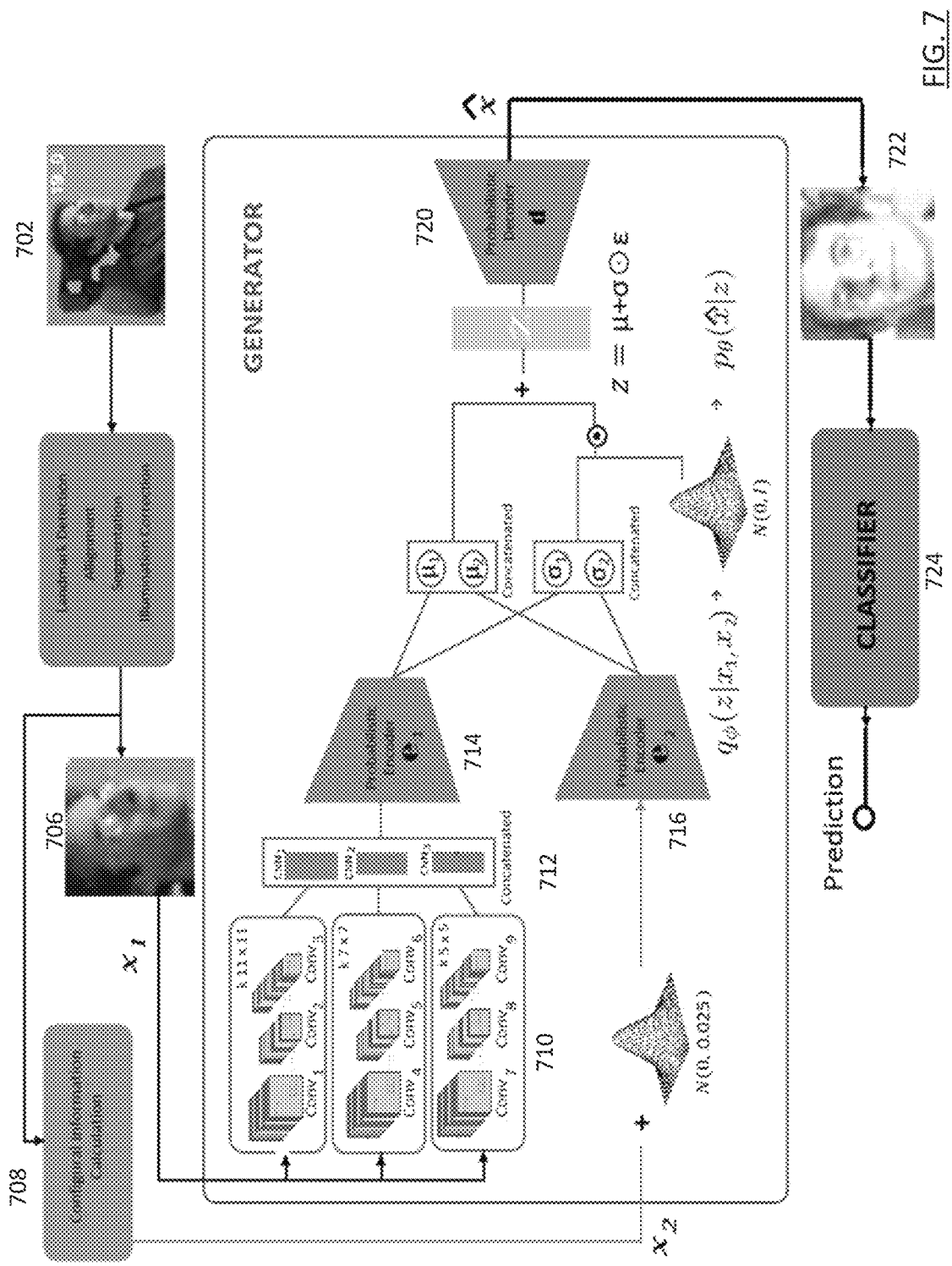
FIG. 7 illustrates an example of a holistic network for performing face recognition, according to an embodiment.

In some embodiments, the only difference between the B+CI model and the holistic network (i.e., B+CI+H model) is the usage of a classifier. An example of a holistic network is shown at FIG. 7. In some implementations, the holistic network includes a generator and a classifier. The generator can extract facial features from one or more images, and can use those features to generate the holistic image. A second classifier network can perform the recognition task.

The role of the generator is to create a holistic representation of the input image. It can be based on the variational autoencoder architecture. In some implementations, the generator takes two inputs: an image 706 (e.g., color image) and the configural information 708. The image 706 can be generated after performing landmark detection, alignment, segmentation, illumination correction, and/or the like on image 702 (which captures an image of a user's face at any profile, such as frontal, left, or right). A plurality of CNNs 710 can be applied to the image 706 to extract facial features. The outputs 712 of the CNNs can be concatenated and fed to a 3-layer encoder network 714 with, for example, 4096, 2048, and 1024 neurons. The third layer of the encoder network 714 can be connected to a mean and a variance layer of, for example, 64 neurons each.

The second input, the configural information 708, can be fed to a separate and identical encoder 716 ending with a mean and a variance layer of, for example, 64 neurons each.

The outputs of the two encoders 714 and 716 can be concatenated together to form a μ vector and a ε vector, each with 128 elements. Applying the following equation to the μ and ε vectors produces the latent vector Z:

$$Z=\mu+\varepsilon\odot N(0,1),$$

where μ is the mean, E is the variance (the outputs of the encoders), $\odot$ is an element-wise multiplication, and N(0,1) is a zero mean and unit variance Gaussian distribution.

The 128 latent vector Z can be fed to a three-layer decoder network 720 with e.g., 1024, 2048, and 4096 neurons (same as the encoders 714 and 716 in reverse order). The final output layer can have, for example, 4096 (or 64 by 64) neurons (same dimension as the ground truth image), followed by a Sigmoid activation function. The Sigmoid function can be:

$$S(x) = \frac{1}{1 + e^{-x}}$$

The output 722 or the network prediction (e.g., a 64×64 grayscale image) is the expected frontal face view and neutral expression of the subject (or the ground truth image) regardless of the pose and expression of the input. The output 722 can be compared to a ground truth image via classifier 724. If classifier 724 determines that the similarity between output 722 and the ground trust image is above a predetermined threshold (e.g., at least 80% similar, at least 90% similar, at least 95% similar, at least 99% similar, and/or the like), the prediction can indicate that the user at image 702 is the same user as in the ground truth image.

The holistic model can use a VAE loss function. The loss function can include two terms. The first term is the marginal likelihood of a data point X, given the latent vector z, written as E z~$q_\phi$(x|z)[log($P_\theta$(x|z)]. This term can also be referred to as the data fidelity loss. Minimizing this term reconstruct the input X from the latent representation Z. The second term is the KL divergent. Maximizing the KL divergent forces, the approximate posterior, the latent vector z, to be close to the prior 134z). It can be written as $D_{KL}$ ($q_\theta$)(z|x)||$p_\theta$(z)). Since the objective is to reconstruct the ground truth image (or label), which might be different from the input image, the data fidelity term can be replaced with the cosine proximity and the Least Absolute Difference (L1-norm) functions.

Cosine proximity can measure the similarity (e.g., +1) or dissimilarity (e.g., −1) between two vectors where, for example, both vectors are normalized to be between 0 and 1. In this case, the two vectors are the prediction vector or output image X^, the target vector, or the ground truth image X. The boundaries can be enforced by applying the sigmoid activation function on the prediction vector as outlined above and the target vector by dividing the ground truth images by 255. Maximizing the cosine proximity can cause the prediction vector to be close to the target vector.

Cosine proximity uses the angle between two vectors to estimate their similarity, so L1-norm can be added to the data fidelity term to account for their magnitudes. L1-norm can be the summation of the absolute differences between two vectors expressed mathematically as $$\sum_{k=0}^{n}|\hat{X}-X|.$$

Since the prediction vector is a generated image, it can be prone to being sparse and noisy, as the model converges during training. By not squaring the differences of the two vectors, Li-norm puts less emphasis on noise in the output. Therefore, it can be better suited for image generation than the Mean-Squared Error (MSE) or L2-norm. In some instances, L1-norm generates clear images whereas L2-norm generates blurry images (this can be proven mathematically, for example by deriving the filters or kernels that L1-Norm and L2-norm are approximating—e.g., the median and the mean filters, respectively). Considering that the classification may be based solely on the generated images, generating non-blurry images can be desirable to achieve desirable performance.

As stated earlier, the feature extractor of the holistic network (CNNs 710) can be composed of or can include, for example, three CNNs running/operating in parallel, with each CNN being three levels deep. In recent years, as tasks have grown more complex, learning networks have become deeper in the number of layers. Networks with more than one hidden layer and non-linear activation function can be used to solve problems that are not linearly separable. As a deep network back propagates, however, the gradients can become increasingly smaller at each level, to the point where it becomes zero, which can prevent the network from learning (this is referred to as the "vanishing gradient problem"). There are a number of ways to address this vanishing gradient problem, one of which is by using a wide network instead of a deep network.

A kernel is a squared 2D matrix or mask that can be used to filter certain information from an image by applying a convolution. Depending on the design of the kernel, the kernel can be used for blurring, sharpening, detecting edges, and more. In learning models, instead of pre-engineering these kernels, the kernels are learned by the convolutional neural network during training guided by a loss function. During prediction, a convolution uses the learned kernel to extract certain features from an input image. The size of the kernel and its placement in the network (first, second or third layer) determine features learned at various levels of abstraction. Some known techniques start with a large kernel, say 7 by 7, then progressively reduce its size as the network goes deeper and the image is shrinking. According to some embodiments of the present disclosure, by contrast, the kernel size is held constant, for example when multiple kernel sizes are used in parallel. As a result, 11 by 11 was chosen for CNN #1, 7 by 7 for CNN #2 and 5 by 5 for CNN #3.

In some embodiments, an image (or multiple images) can be used for each individual as the ground truth label for all images belonging to that individual (also referred to herein as a class, a user, a person, or a subject). In some implementations, the method of selection for the ground truth image is or includes visual inspection by a human, where the image is inspected to ensure that it shows the user from a frontal view. By using this ground truth image to optimize the learning task, the generator learns to reconstruct all images of the user (regardless of the view of the user) to a frontal view. A frontal view is substantially (e.g., within 1%, within 5%, within 10%, within 25%, within 33%, and/or the like) in the middle between the left profile and right profile. Another variation would be an average of all the images belonging to that class.

The output image (e.g., 64×64 grayscale image) by the generator can be flattened and fed to classifier 724. In one example, the classifier 724 is a neural network with one hidden layer of 256 neurons with a Hyperbolic Tangent activation function and an output layer for class prediction. A Softmax activation can be used in the output layer to represent the confidence level for each class prediction. The summed probability of all the output can be equal to one. L2-norm can be the loss function (e.g., to make class prediction and not generate images).

Experiments

The effectiveness of holistic processing was tested using a hand-written digit recognition challenge (see e.g., M. Joseph and K. Elleithy, "Digit Recognition Based on Specialization, Decomposition and Holistic Processing," Machine Learning and Knowledge Extraction, vol. 2, no. 3, 2020, pp. 271-282). As a proof of concept, a simplified version of the concepts inspired by the human visual cortex was implemented. The CNN had 3 convolutions followed by a VAE. No configural information was injected into the network and no pre-processing was performed. Although some of the challenges previously encountered in face recognition, such as issues with illumination, head poses, occlusion, aging, and expression changes were not observed, in-class variations due to affine transformations nevertheless still posed a challenge. As such, a better-engineered model was still desirable to achieve high prediction accuracy.

Figure 8:
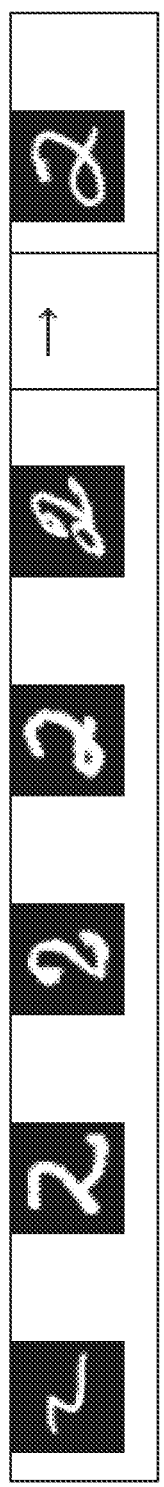
FIG. 8 shows various versions of the numeral "2" and a standard template into which each can be transformed/to which each can be mapped, according to an embodiment.

In accordance with an embodiment, an object recognition task was decomposed into two tasks/sub-systems. The first sub-system was configured to take as input a digit in any configuration or orientation and transform it into a holistic representation with a default orientation learned using supervised learning. The second sub-system used the holistic representation generated by the first network to extract features to perform the recognition. If a model can take any variation of a hand written digit and transform it to a standad template, as demonstrated in FIG. 8, classifying the resulting template becomes less computationally expensive, and can be performed using a less complex classifier.

Figure 9:
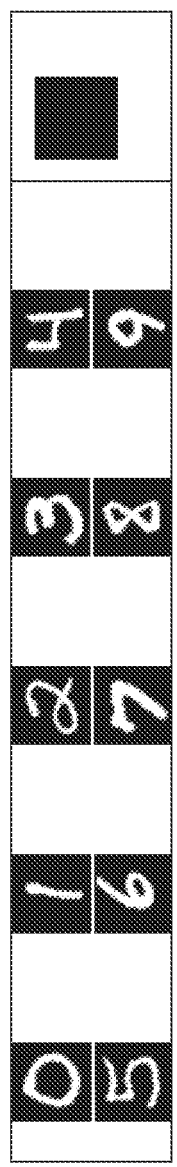
FIG. 9 shows example ground truth labels for use in training a generator network (e.g., such that the ground truth labels are transformed/incorporated into a standard template), according to an embodiment.

If there are ten digits (e.g., 0-9), ten separate but identical networks can be used, where each network is trained to make predictions on a single digit by outputting the ground truth of that digit or a blank image for all other digits. FIG. 9 shows an example of ground truth labels used to train a generator. For example, the network being trained to recognize or generate the digit "1" can be given the image label of 1 shown in FIG. 9 whenever the training input is the image of a 1, and may be given the blank image (furthest image on the right of FIG. 9) for all other numbers.

The MNIST dataset (see, e.g., Y. LeCun, C. Cortes, and C. J. Burges, "The MNIST database of handwritten digits, 1998," URL http://yann. lecun. com/exdb/mnist, vol. 10, 1998, pp. 34.) is a known benchmark with 60,000 training images and 10,000 test images. The images are 28×28 pixels gray-level bitmaps with digit centered in a frame in white with a black background. As a result, digit detection is not used since the digit is the only object in the image. In an example implementation, the entire 60,000 images of the MNIST dataset were used as training input to train the generator. The ground truth images that are used as labels were chosen from the training set to be as differentiable as possible (see, e.g., FIG. 9). The ground truth images represented a holistic representation that the generator was expected to reconstruct. Another set of 50 images, five from each class, was randomly chosen from the training set and used as a validation set.

Each generator network was trained separately for 200 epochs using the full 60,000 image training set. Due to the probabilistic nature of the network, some digits were trained more than others. Starting at epoch 100, the model's progress was tested using the validation set, and a snapshot of the model was saved for all 100% success rate against a validation set. Success in this context was defined as the model's ability to reconstruct the digit for which it is being trained to recognized. The model was expected to produce a blank image for all other digits. Once the training ended, a stable checkpoint was chosen for further integrated training. A model was deemed stable if, during training, it had at least 3 consecutive successes using the validation set. The classifier Neural Network was trained separately with the full training data set.

The success rate S (or accuracy) was calculated as follows: The total number of digits correctly predicted by the network or true positive (TP), divided by the number of total numbers of test data (TD). Therefore $$S = \frac{TP}{TD}.$$

Consequently, the error rate ER is given by $$\frac{TD - TP}{TD}.$$

The integrated model achieved a 99.05% accuracy in the recognition task. The model exhibited desirable ability to recognize and reconstruct the digit for which it is trained for, and did so with a 99.85% average accuracy, as shown in FIG. 10.

Figure 11:
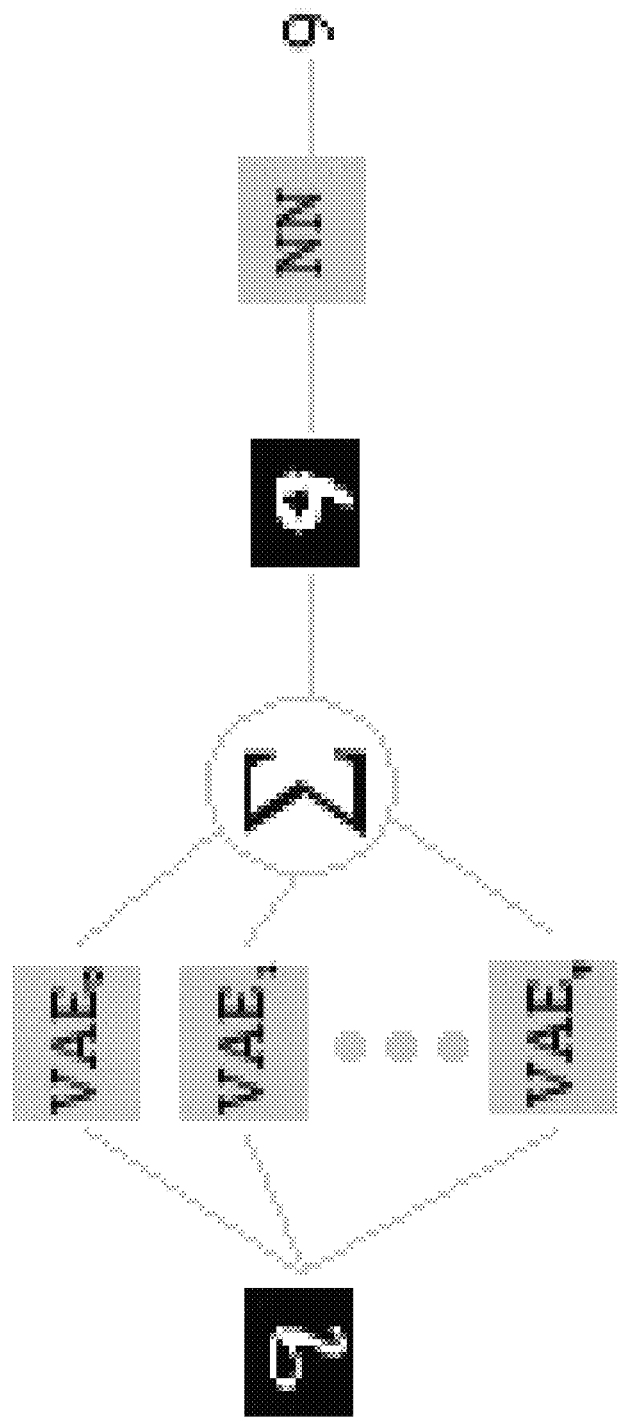
FIG. 11 is a diagram illustrating outputs of multiple different models being summed and fed to a classifier to generate an output value, according to an embodiment.

There was a discrepancy between the integrated model accuracy and the average accuracy of the individual models. During testing, each test image was fed in parallel to all ten networks. The model that belonged to the same class as the input was expected to output that digit and all others were expected to output a blank image (all zeros). The outputs of all the models were added together then fed to the classifier, as shown in FIG. 11. The problems arose whenever one or more models made a false positive. Adding the image of a bad prediction with a good prediction confused the classifier. As a result, the classifier was unable to consistently make the correct prediction.

The face recognition models (B-model, B-CI model, and B-CI-H model) were evaluated using two datasets, the Multi-PIE (see, e.g., R. Gross, I. Matthews, J. Cohn, T. Kanade, and S. Baker, "The CMU multi-pose, illumination, and expression (Multi-PIE) face database," CMU Robotics Institute. TR-07-08, Tech. Rep, 2007.) and the Label Face in the Wild (LFW) (see, e.g., G. B. Huang and E. Learned-Miller, "Labeled faces in the wild: Updates and new reporting procedures," Dept. Comput. Sci., Univ. Massachusetts Amherst, Amherst, MA, USA, Tech. Rep, vol. 14, no. 003, 2014.). The performance of all three models (i.e., B-Model, B-CI and B-CI-H) were evaluated using the same datasets and under the same constraints. No pre-training using a different dataset was performed. To quantify the contribution of the configural information to the network prediction, several experiments were conducted with both configurations—with the CI sub-network enabled (B+CI model), and with the CI sub-network disabled (baseline model or Model-B). All experiments were repeated at least twice, to ensure repeatability.

Figure 12:
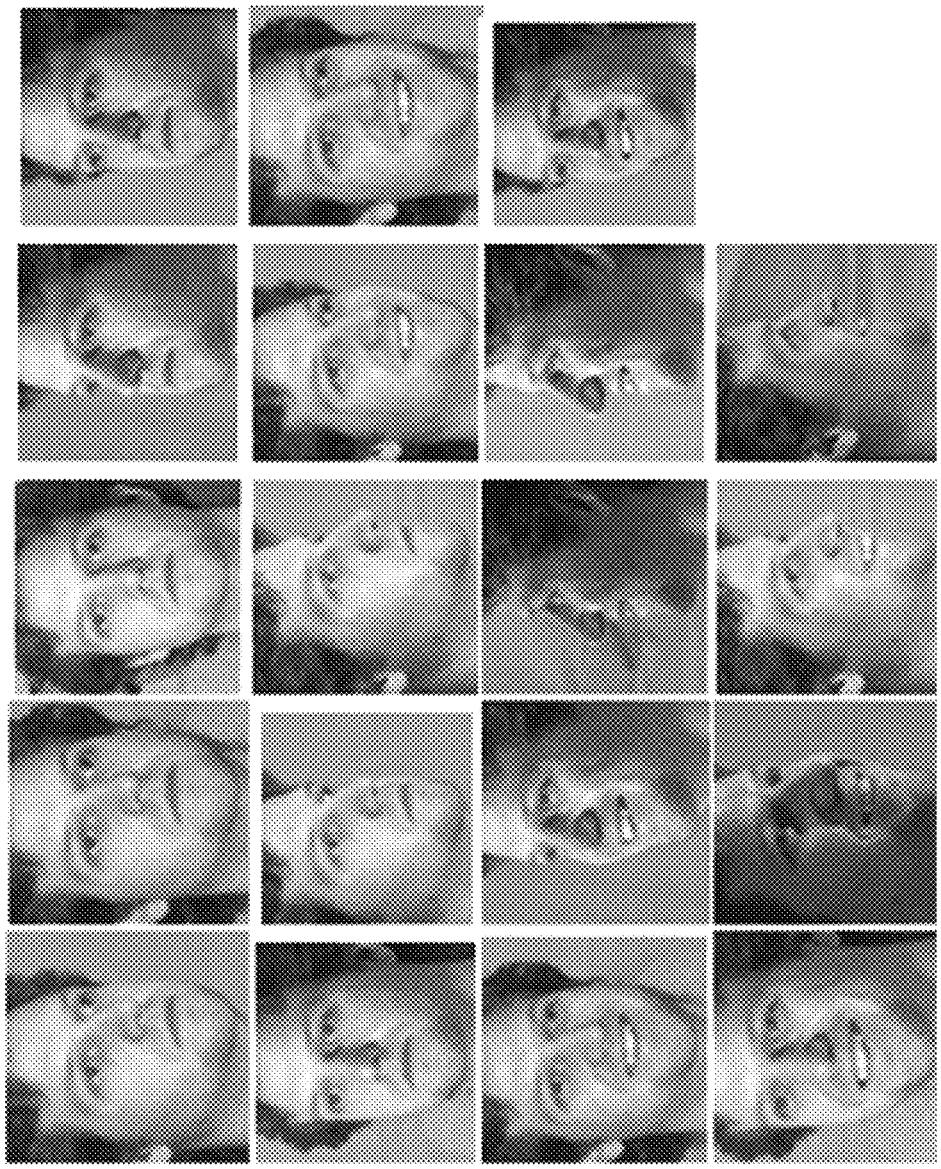
FIG. 12 shows at least a portion of a training dataset for a multi-PIE Dataset, according to an embodiment.

Some known models with accuracy above 99% use datasets with mostly frontal faces. When these models are exposed to test cases with large pose variations (e.g., profile faces in +/−) 90° their accuracy diminish considerably. For example, the Label Face in the Wild dataset (LFW) mostly has frontal faces, not a lot of pose variations or profile faces (see, e.g., S. Sengupta, J.-C. Chen, C. Castillo, V. M. Patel, R. Chellappa, and D. W. Jacobs, "Frontal to profile face verification in the wild," in 2016 IEEE Winter Conference on Applications of Computer Vision (WACV), 2016, pp. 1-9: IEEE.). The Multi-PIE benchmark, on the other hand, had 754,204 images of 337 individuals. Each individual had 15 different poses and 20 different illuminations taken over 4 sessions with months separated between each session. During experimentation, a subset of the data was used that had 100 and 200 individuals, 13 different poses (10°, 41°, 50°, 51°, 80°, 90°, 110°, 120°, 130°, 140°, 190°, 200°, 240°), 2 sessions, and 20 different illuminations (where session 2 used the same poses as session 1, but the subjects have different facial expressions). This led to a total of 520 images per individuals. The images were pre-processed as previously outlined and split into two mutually exclusive sets: a training and a test set. The training set was composed of 380 images per individual, made of 11 total poses & expressions and 20 different illuminations (i.e., session 1: 41°, 50°, 51°, 80°, 130°, 140°, 190°, 200° and session 2: 41°, 50°, 51°, 80°, 110°, 120°, 130°, 140°, 190°, 200°, 240°). FIG. 12 shows, for the Multi-PIE Dataset, the training set for experiments composed of 8 images from session #1 and 11 images from session #2, for a total of 380 images (19 times 20 different illuminations) per subject.

Figure 13:
FIG. 13 shows at least a portion of the training dataset for the multi-PIE Dataset.

The test set was composed of 140 images per individual, 5 different poses, 2 different expressions, and 20 different illuminations (session 1: 10°, 90°, 110°, 120°, 240° and session 2: 10°, 90°), as shown in FIG. 13. A validation set was constructed by taking the first image of every pose in the training set. The model was not trained with any samples from pose 10° and 90° from either session. For each subject, one frontal face with neutral expression and neutral illumination was chosen from the training set to be the ground truth label for the generator. The ground truth was the holistic representation the generator is expected to reconstruct in gray scale format. FIG. 13 shows, for the multi-PIE Dataset, that the test set for all experiments was composed of 5 images from session #1 and 2 images from session #2, for a total of 140 images (7 times 20 different illuminations) per subject.

Figure 14:
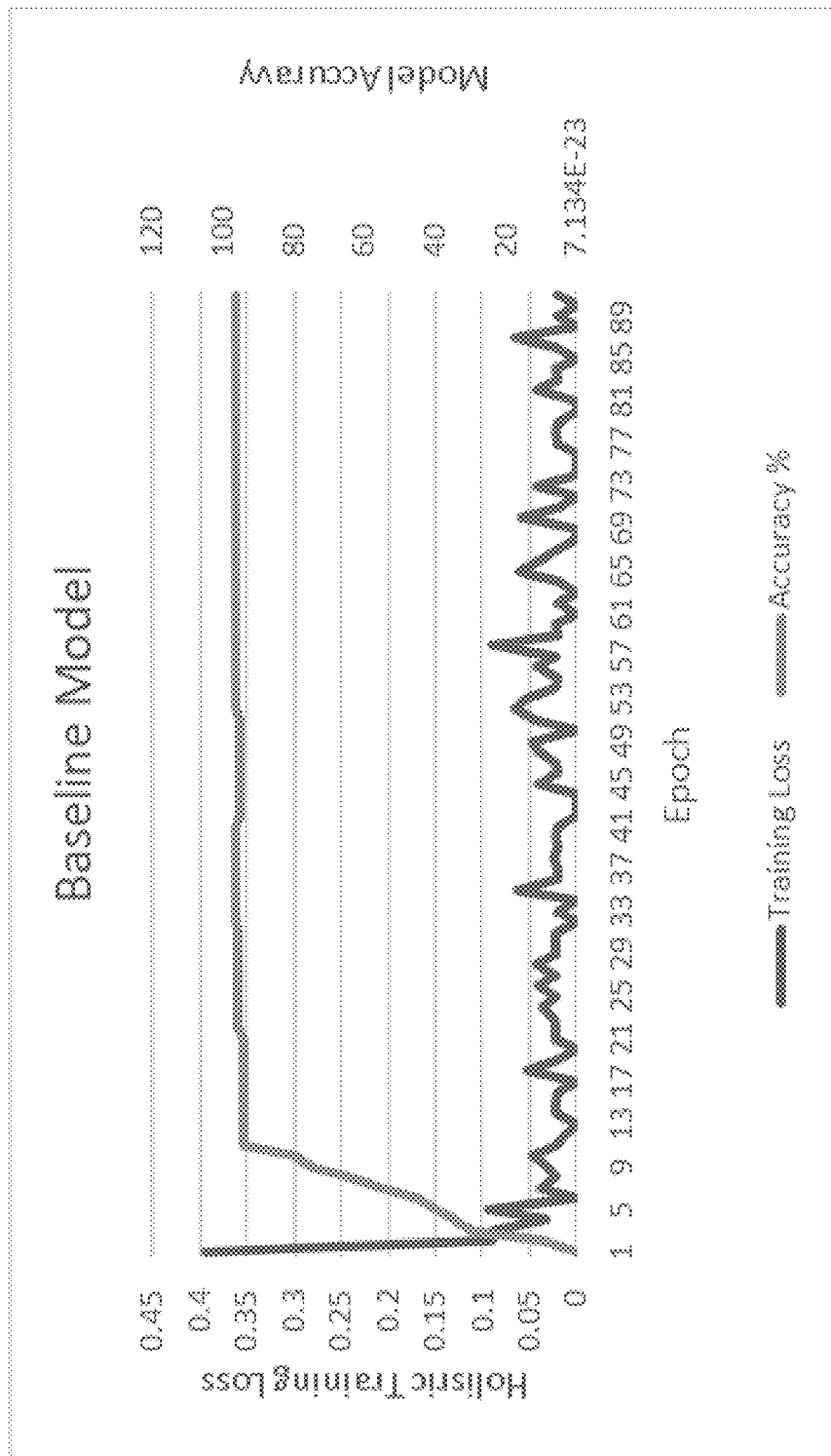
FIG. 14 is a plot showing training loss and accuracy results for a baseline model, according to an embodiment.
Figure 15:
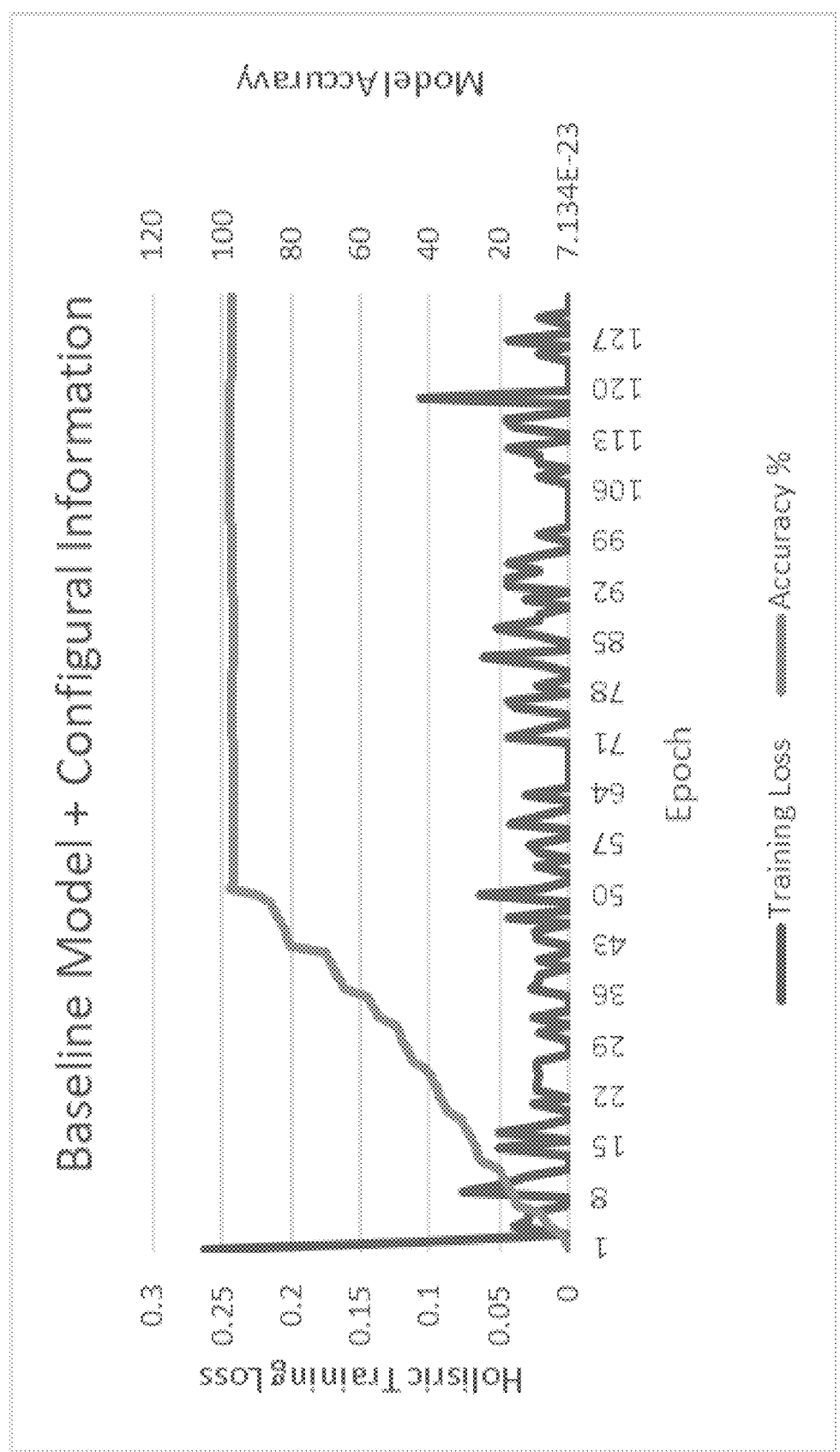
FIG. 15 is a plot showing training loss and accuracy results for a baseline model that also used configural information, according to an embodiment.
Figure 16:
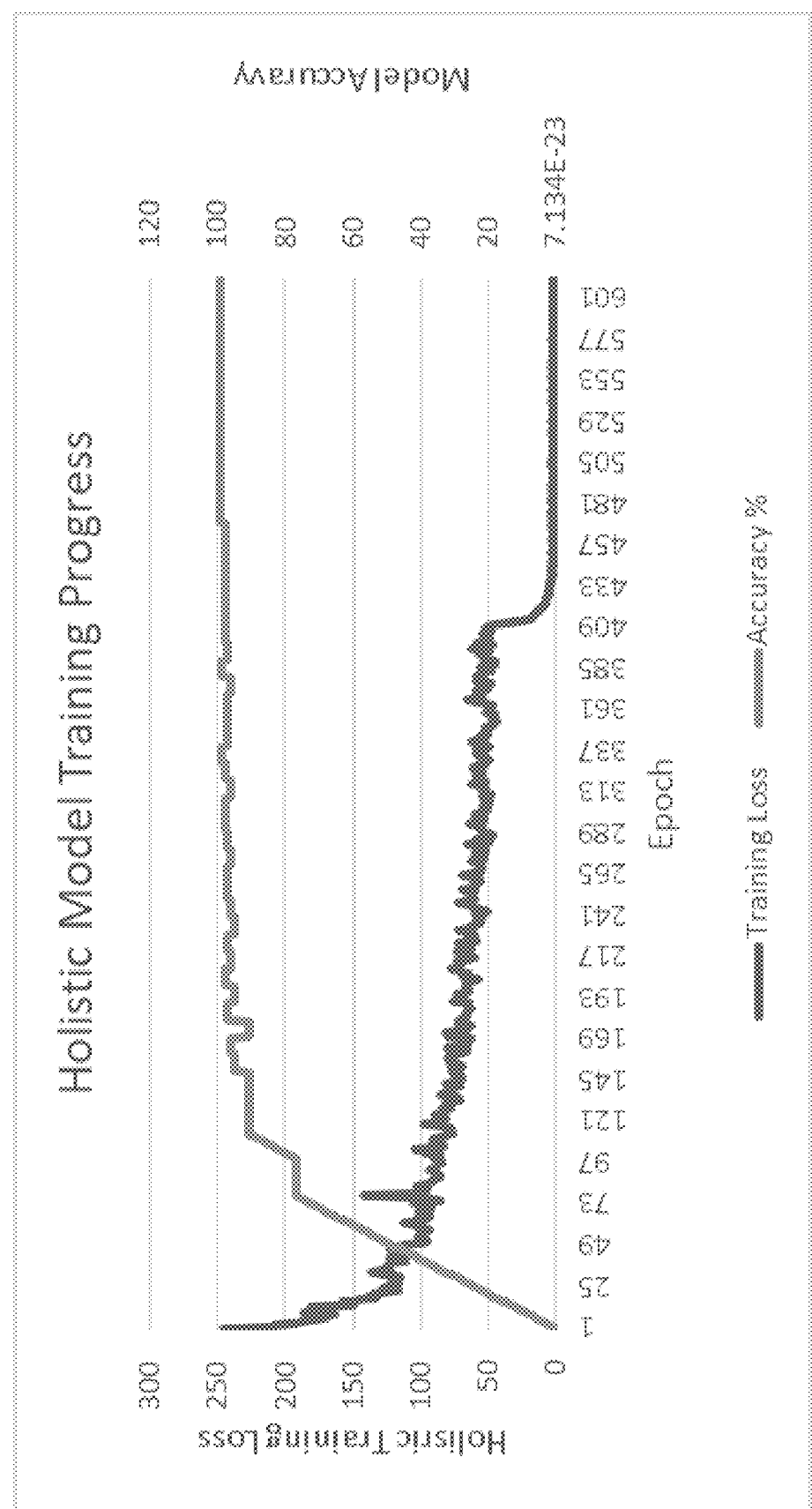
FIG. 16 is a plot showing training loss and accuracy results for a baseline model that also used configural information and incorporated a holistic approach, according to an embodiment.

The generator and the classifier were trained separately. The generator was trained in three stages. The first stage was to initialize the model parameters by training the model with only the ground truth images. Once the model learned to reconstruct the ground truth images, phase two began training with the full training set, until it achieved 100% recall on the validation set. Since the exponential moving average was used during prediction, the third and final phase involved fine-tuning the training using a latent Z vector calculated with the exponential moving average instead of the random normal distribution. The classifier neural network was trained using only the ground truth images (gray scale format). The same training, validation and test sets were used for all three models. FIGS. 14-16 show the results for each of the three models.

The models were evaluated against each other as well as against some known models in face recognition. Comparing the three models (i.e., B-Model, B+CI Model and B+CI+H Model) side by side allowed the contribution of each model to be compared to the overall accuracy of the model. FIG. 17 shows results for two different sample sizes, 100 and 200 subjects. The holistic model consistently outperformed the classical models. The performance of the holistic model against the B model and the B+CI model demonstrated that computational models that process face holistically are more efficient than models that skip the holistic step to go straight to recognition. Furthermore, the superior performance of the B+CI model against the B model, 5.33% for the 100 subjects and 1.01% for the 200 subjects, was attributed to the contribution of the configural information features.

The accuracy of the "proposed model" (i.e., a holistic model of the present disclosure, in accordance with one embodiment) was compared with multiple known models for the Multi-PIE dataset. FIG. 18 shows that the proposed/holistic model has an accuracy of 99.61% @Rank-1, which outperforms known models for Multi-PIE by at least 2.14%.

When comparing models, there were two additional factors taken into consideration: the size of the model (e.g., number of convolutional layers) and the amount of resources used to train the model (e.g., training data size and number of iterations or epochs).

Labeled Faces in the Wild dataset (LFW) (see, e.g., G. B. Huang and E. Learned-Miller, "Labeled faces in the wild: Updates and new reporting procedures," Dept. Comput. Sci., Univ. Massachusetts Amherst, Amherst, MA, USA, Tech. Rep, vol. 14, no. 003, 2014.) is an unconstrained verification dataset that contains 13,233 images with 5,749 identities. There are at least three known evaluation protocols for this dataset. The first is to feed the 6000 pairs of similar and dissimilar faces in the dataset and evaluate which pairs the model predict accurately (see, e.g., G. B. Huang and E. Learned-Miller, "Labeled faces in the wild: Updates and new reporting procedures," Dept. Comput. Sci., Univ. Massachusetts Amherst, Amherst, MA, USA, Tech. Rep, vol. 14, no. 003, 2014.). The second protocol involves identification task or scenario on open and close set (see, e.g., L. Best-Rowden, H. Han, C. Otto, B. F. Klare, and A. K. Jain, "Unconstrained face recognition: Identifying a person of interest from a media collection," IEEE Transactions on Information Forensics and Security, vol. 9, no. 12, 2014, pp. 2144-2157.). The third protocol combines verification task and open-set identification task (see, e.g., S. Liao, Z. Lei, D. Yi, and S. Z. Li, "A benchmark study of large-scale unconstrained face recognition," in IEEE international joint conference on biometrics, IEEE, 2014, pp. 1-8.). All three protocols used another dataset with millions of images to trained the model. LFW was then use for testing (e.g., identification or verification).

Figure 19A:
FIG. 19A shows a training set made of 12 images from each subject.
Figure 19B:
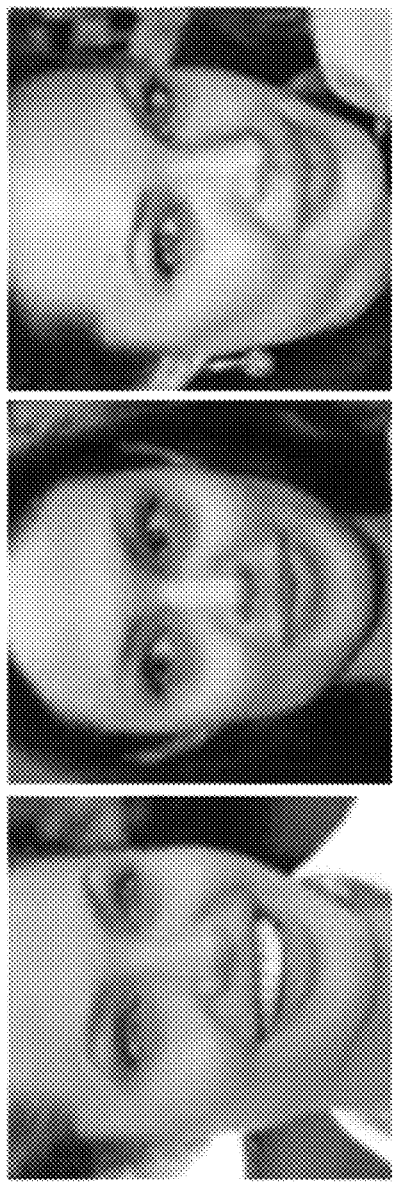
FIG. 19B shows data used for testing.

The first 100 subjects in LFW were used to train and test the models' accuracy to recognize faces in unconstrained environment. No other dataset was used to pre-train the models. DLib and MTCNN were used to detect and crop the face to a 128 by 128 element size image, then the image was resize to a 64 by 64 color image. The configural information was calculated using the algorithm discussed previously herein. The data was divided into two mutually exclusive sets: a training set made of 12 images from each subject (as shown in FIG. 19A) and the rest of the data, about 20% (3 images) (as shown in FIG. 19B), was used as test images.

FIG. 19C reports results for the three models using a sample size consisting of 100 subjects. Learning models use training data to optimize the objective function. Learning models sometimes use a lot of training data to optimize the objective function. Given the lack of the training images in the LFW dataset, achieving state-of-the-art accuracy was not the objective of the experiments conducted with the LFW dataset. Rather, the objective was to compare and contrast the capability of the 3 models against each other, and to isolate the contribution of CIs and processing faces holistically.

The baseline model (B-Model) and the holistic model have an average accuracy that are at par with each other (within the margin of error of 0.33%). However, both models outperform the B+CI model by about 2.33%. This illustrates the limitation of the configural information and highlight the effectiveness of processing faces holistically. While the configural information complement the features extracted by the CNNs and helped corelate profile faces with frontal faces, it can sometimes limited by the total number of features (e.g., 8 features). Since the faces in the LFW dataset are unconstrained and primarily in frontal orientation, the advantages the CIs offers are less significant and only 8 CIs do not provide enough interclass discrimination. As the number of classes increases, the lack of features in the CIs increases the number of false positive, as shown in the case of the model B-CI. However, such deficiency was less pronounced in the performance results for holistic model. The holistic model was able to compensate for the loss of performance introduced by the CIs, and that is for two reasons: First, processing faces holistically allow the network to learn more efficiently the training data distribution. Second, the KL Divergence term in the loss function, (i.e., $D_{KL}(q_\phi(z|x)\|p_\theta(z))$) working together with the sparse latent Z vector to following a Gaussian random distribution (i.e., $Z=\mu+\varepsilon \odot N(0,1)$), help creates a margin between the classes. As a result, the holistic model outperformed both classical models when dealing with dataset with high number of profile faces, and for dataset with mainly frontal faces, it outperformed the B+CI model and performed at par with the baseline model.

Some implementations are related to the development of an architecture model based on VAE and a non-deterministic model that was engineered to make deterministic prediction. Some implementations are related to a derivation of a close-formed algorithm capable of performing shadow segmentation in real-time. Some implementations are related to incorporation of configural information into a neural network model. Some implementations are related to affirmation of the null hypothesis and demonstration of the superior capability of holistic models.

The face recognition embodiments described herein address some of the complexities that are associated with known processes, such as issues with images of faces presented in different scales, pose variances, different facial expression, uncontrolled lighting and background, etc. Some of these challenges are addressed during pre-processing and others are addressed by the model, all in accordance with the biological inspiration. In some embodiments, a neural network processes an image holistically, i.e., end to end, allowing the network to adopt an internal representation that retains similarity information. Coupled with the configural information, the resultant network is capable of making predictions from unseen profile images, with desirable accuracy. The holistic models set forth herein, according to one or more embodiments, outperform known models.

In one use case, face recognition/verification uses biometrics information to authenticate or identify a user. While face recognition provides a means to identify a user, is can be prone to certain spoofing attacks. Currently there exists no software only based solution, that can withstand spoofing attacks using high-quality photograph, video or 3D mask of a valid user, to gain un-authorized access to a system. These spoofing techniques succeed because the recognition models rely on a single frontal face image for authentication. However, a system that can randomly select a sequence of N frames of the user's face (where N>2), in yaw orientation ranging from, for example, −90° to +90° and use those frames as the basis for the authentication, would be more robust against these spoofing attacks. The techniques discussed herein makes such a system possible. For example, because a photograph spoof can only present the user in one orientation, the 3D face mask would fail to authenticate due to similarity discrepancy. It would be difficult for a perpetrator to obtain a video that meets the authentication frames requirements without the user's consent. As a result, a video spoof is unlike to succeed. This approach uses a single RGB camera (e.g., instead of a laser) to acquire the biological data to be authenticated and reduces the attack vectors that can be exploited.

Figure 20:
FIG. 20 shows a block diagram of a system for generating a frontal view image of a user, according to an embodiment.

FIG. 20 shows a block diagram of a system that can generate a frontal view image of a user, according to an embodiment. The system can be any type of compute device, such as a desktop, laptop, tablet, phone, and/or the like. The system includes a processor 204, a camera, and a memory 206, each operatively coupled to/communicably coupled to one another.

The processor 202 can be, for example, a hardware based integrated circuit (IC) or any other suitable processing device configured to run and/or execute a set of instructions or code. For example, the processor 202 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 202 is configured to run any of the methods and/or portions of methods discussed herein.

The camera 204 can be any type of camera. The camera 204 can be configured to captures images and/or video. For example, 204 can capture images or video of a user at different profiles (e.g., as the users turns their face).

The memory 206 can be, for example, a random-access memory (RAM), a memory buffer, a hard drive, a read-only memory (ROM), an erasable programmable read-only memory (EPROM), and/or the like. The memory 206 can be configured to store data used by the processor 202 to perform the techniques discussed herein. In some instances, the memory 206 can store, for example, one or more software programs and/or code that can include instructions to cause the processor 202 to perform one or more processes, functions, and/or the like. In some implementations, the memory 206 includes extendible storage units that can be added and used incrementally. In some implementations, the memory 206 can be a portable memory (for example, a flash drive, a portable hard disk, and/or the like) that can be operatively coupled to the processor 202. In some instances, the memory 206 can be remotely operatively coupled with a compute device (not shown in FIG. 20).

Memory 206 can include image 208. Image 208 can be captured by camera 204, and show the face of a user (e.g., at a left profile, at a right, profile, and a frontal profile, etc.). Image 706 from FIG. 7 is an example of image 208.

Image 208 can be input into CNNs 210 to generate CNN outputs 212. CNNs 210 can include a plurality of CNNs, and image 208 can be input into each CNN from CNNs 210 (e.g., in parallel and without weight sharing). CNNs 710 from FIG. 7 are an example of CNNs 210. Each CNN from CNNs 210 can then generate a CNN output, thereby forming CNN outputs 212.

CNN outputs 212 can be concatenated to CNN output 214, and input into encoder 216. Outputs 712 from FIG. 7 are an example of CNN output 214. In response, encoder 216 can generate a mean value 218 and variance value 220 associated with the concatenated CNN output 214. Encoder 714 from FIG. 7 is an example of encoder 216.

Configural information 222 can be determined using image 208. Configural information can indicate distances between facial landmarks of the user. Configural information 708 from FIG. 7 is an example of configural information 222.

Configural information 223 can be input to encoder 226 to generate mean value 228 and variance value 230 associated with the configural information 222. Encoder 716 from FIG. 7 is an example of encoder 226.

Vector 232 can be generated using mean value 218 and mean value 223 (e.g., by concatenating both mean values). Vector 236 can be generated using variance value 220 and variance value 230 (e.g., by concatenating both mean values). Vector 232 and vector 234 can then be used to generate latent vector 236 (e.g., using $Z=\mu+\varepsilon \odot N(0,1)$ as discussed with respect to FIG. 7). Latent vector 236 can be input to decoder 238 to generate image 240. Image 240 can show the user at the frontal view. Decoder 720 from FIG. 7 is an example of decoder 238. Image 722 from FIG. 7 is an example of image 240.

Ground truth image 242 can show the image at the frontal view. Image 240 and ground truth image 242 can be compared to determine a similarity (e.g., using classifier 724 from FIG. 7). If the similarity is above a predetermined threshold, a determination is made that the user that image 208 is of is the same user as in the ground truth image 242.

In one example, image 208 was taken in response to a user attempting to access a secured resource, such as a phone (e.g., for face recognition). Image 208 is transformed into image 240, and image 240 is compared to ground truth image 242. If the similarity between image 208 and ground truth image 242 is greater than a predetermined threshold, the user can have access to the secured resource.

As another example, image 208 was taken in response to a user attempting to access a secured resource, such as a phone (e.g., for face recognition). Image 208 is transformed into image 240, and image 240 is compared to ground truth image 242. Additionally, another image was taken of the user at view different from the view of image 208. The additional image can also be transformed into the frontal view. If the similarity between (1) image 208 and ground truth image 242 and (2) the additional image and ground truth image 242 is greater than a predetermined threshold, the user can have access to the secured resource. As can be appreciated, any number of images at any number of different profiles can be transformed and compared to the ground truth image 242 before granting access to the secured resource.

Although FIG. 20 and other implementations described herein disclose transforming an image into a frontal view perspective at the target perspective, it can be appreciated that any other perspective (e.g., left, right, right-center, left-center, back, etc.) can be used at the target perspective in other implementations.

Figure 21:
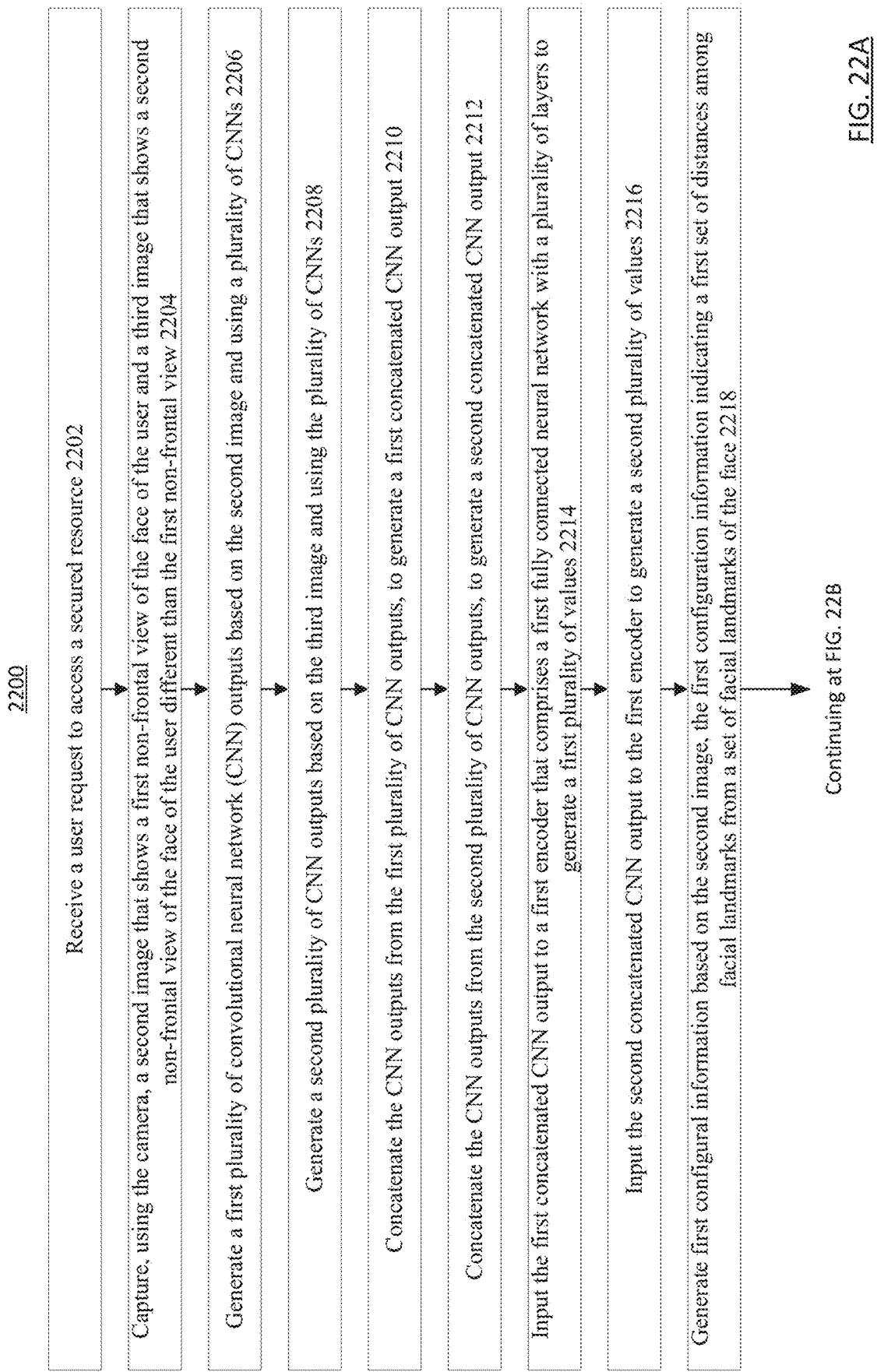
FIG. 21 shows a flowchart of a method for generating an image showing a frontal view of a face in response to receiving an image showing a non-frontal view of the face, according to some embodiments.

FIG. 21 shows a flowchart of a method 2100 to generate an image showing a frontal view of a face in response to receiving an image showing a non-frontal view of the face, according to an embodiment. In some implementations, method 2100 is performed by a processor (e.g., processor 202).

At 2102, a first image (e.g., image 208) showing a non-frontal view of a face of a user is received. For example, a camera (camera 204) can capture the first image and sent a representation of the first image to a processor (e.g., processor 202).

At 2104, the first image is input into each convolutional neural network (CNN) from a plurality of CNNs (e.g., CNNs 210) to generate a plurality of CNN outputs (e.g., CNN outputs 212). In some implementations, 2104 is performed automatically (e.g., without human intervention) in response to completing 2102.

At 2016, the CNN outputs from the plurality of CNN outputs are concatenated to generate a concatenated CNN output (e.g., concatenated CNN output 214). In some implementations, 2106 is performed automatically (e.g., without human intervention) in response to completing 2104.

At 2108, the concatenated CNN output is input to a first encoder (e.g., encoder 216) that comprises a first fully connected neural network with a plurality of layers to generate a first value for a first statistical property (e.g., mean value 218) and a first value for a second statistical property (e.g., variance value 220). In some implementations, 2108 is performed automatically (e.g., without human intervention) in response to completing 2106.

At 2110, configural information (e.g., configural information 222) is generated based on the first image. The configural information indicates a set of distances associated with a set of facial landmarks of the face. In some implementations, 2110 is performed automatically (e.g., without human intervention) in response to completing 2108.

At 2112, the configural information is input to a second encoder (e.g., encoder 226) that comprises a second fully connected neural network with a plurality of layers to generate a second value for the first statistical property (e.g., mean value 228) and a second value for the second statistical property (e.g., variance value 230). In some implementations, 2112 is performed automatically (e.g., without human intervention) in response to completing 2110. In some implementations, 2112 is performed automatically (e.g., without human intervention) in response to completing 2102.

At 2114, a first vector (e.g., vector 232) is generated based on the first value for the first statistical property and the second value for the first statistical property. In some implementations, 2114 is performed automatically (e.g., without human intervention) in response to completing 2112.

At 2116, a second vector (e.g., vector 234) is generated based on the first value for the second statistical property and the second value for the second statistical property. In some implementations, 2116 is performed automatically (e.g., without human intervention) in response to completing 2114.

At 2118, a latent vector (e.g., latent vector 236) is generated based on the first vector and the second vector. In some implementations, 2118 is performed automatically (e.g., without human intervention) in response to completing 2116 and 2114.

At 2120, the latent vector is input to a decoder (e.g., decoder 238) that comprises a third plurality of fully connected neural networks to generate a second image (e.g., image 240) showing a frontal view of the face of the user. In some implementations, 2120 is performed automatically (e.g., without human intervention) in response to completing 2118.

Some implementations of method 2100 further include receiving a third image (e.g., ground truth image 240) that shows the frontal view of the face of the user. Some implementations of method 2100 further include verifying that a similarity of the second image and the third image are greater than a predetermined threshold. Some implementations of method 2100 further include granting access to an otherwise secured resource in response to verifying that the similarity is greater than the predetermined threshold.

Some implementations of method 2100 further include receiving a preliminary image that shows the face of the user. Some implementations of method 2100 further include processing the preliminary image to generate the first image by performing at least one of landmark detection, alignment, or segmentation on the preliminary image.

In some implementations of method 2100, the set of landmarks includes an eye, an eyebrow, a nose, a mouth, and a chin. In some implementations of method 2100, the set of distances includes (1) a first distance that is between the eye and the eyebrow, (2) a second distance that is between the eye and the nose, (3) a third distance that is between the eye and the mouth, (4) a fourth distance that is between the eye and the chin, (5) a fifth distance that is between the eye and the eyebrow, (6) a sixth distance that is between the nose and the mouth, (7) a seventh distance that is between the eyebrow and the chin, and (8) an eight distance that is between the nose and the eyebrow.

In some implementations of method 2100, the plurality of CNNs includes three CNNs running in parallel without weight sharing.

In some implementations of method 2100, each CNN from the plurality of CNNs uses at least one of a kernel size or a filter size that is different from a kernel size or a filter size of the remaining CNNs from the plurality of CNNs.

In some implementations of method 2100, each CNN from the plurality of CNNs includes three layers. In some implementations of method 2100, the three layers are a convolution layer followed by a pooling layer followed by an activation function layer.

Figure 22:
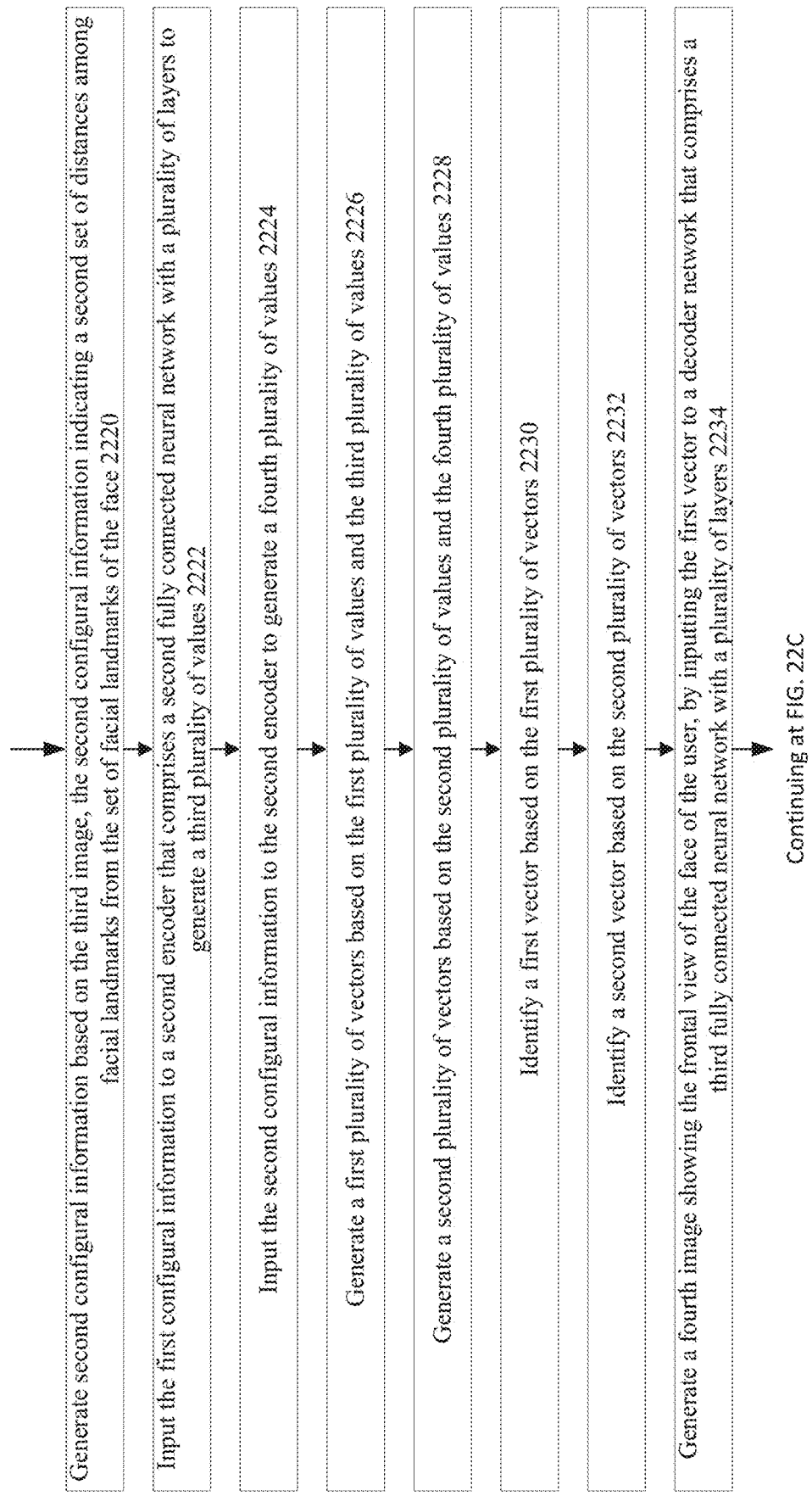
FIGS. 22A-22C show a flowchart of a method for generating multiple frontal view images of a face using non-frontal view images of the face, according to some embodiments.

FIGS. 22A-22C show a flowchart of a method 2200 to generate multiple frontal view images of a face using non-frontal view images of the face, according to an embodiment. In some implementations, method 2200 is performed by a processor (e.g., processor 202).

At 2202, a user request to access a secured resource is received. For example, a user may use their compute device to request access to a phone, website, account, and/or the like.

At 2204, a second image (e.g., image 208) that shows a first non-frontal view of the face of the user and a third image (e.g., not shown in FIG. 20) that shows a second non-frontal view of the face of the user different from the first non-frontal view is captured using a camera. For example, the first non-frontal view can be a left side of the face and the second non-frontal view can be a right side of the face (or vice versa). In some implementations, 2204 is performed automatically (e.g., without human intervention) in response to completing 2202.

At 2206, a first plurality of convolutional neural network (CNN) outputs (e.g., CNN outputs 212) are generated based on the second image and using a plurality of CNNs (e.g., CNNs 210). For example, the second image can be input into each CNN from the first plurality of CNNs. In some implementations, 2206 is performed automatically (e.g., without human intervention) in response to receiving the second image at 2204.

At 2208, a second plurality of CNN outputs (e.g., not shown in FIG. 20) are generated based on the third image and using the plurality of CNNs. For example, the third image can be input into each CNN from the second plurality of CNNs. In some implementations, 2208 is performed automatically (e.g., without human intervention) in response to receiving the third image at 2204.

At 2210, the CNN outputs from the first plurality of CNN outputs are concatenated to generate a first concatenated CNN output (e.g., concatenated CNN output 214). In some implementations, 2210 is performed automatically (e.g., without human intervention) in response to 2206.

At 2212, the CNN outputs from the second plurality of CNN outputs are concatenated to generate a second concatenated CNN output (e.g., not shown in FIG. 20). In some implementations, 2212 is performed automatically (e.g., without human intervention) in response to 2208.

At 2214, the first concatenated CNN output is input to a first encoder (e.g., encoder 216) that comprises a first fully connected neural network with a plurality of layers to generate a first plurality of values (e.g., mean value 218 and variance value 220). In some implementations, 2214 is performed automatically (e.g., without human intervention) in response to 2210.

At 2216, the second concatenated CNN output is input to the first encoder to generate a second plurality of values (e.g., mean value and variance value not shown in FIG. 20). In some implementations, 2216 is performed automatically (e.g., without human intervention) in response to 2212.

At 2218, first configural information (e.g., configural information 222) is generated based on the second image. The first configural information indicates a first set of distances among facial landmarks from a set of facial landmarks of the face. In some implementations, 2218 is performed automatically (e.g., without human intervention) in response to 2216 or receiving the second image at 2204.

At 2220, second configural information (e.g., not shown in FIG. 20) is generated based on the third image. The second configural information indicates a second set of distances among facial landmarks from the set of facial landmarks of the face. In some implementations, 2220 is performed automatically (e.g., without human intervention) in response to 2218.

At 2222, the first configural information is input to a second encoder (e.g., encoder 226) that comprises a second fully connected neural network with a plurality of layers to generate a third plurality of values (e.g., mean value 228 and variance value 230). In some implementations, 2222 is performed automatically (e.g., without human intervention) in response to 2218.

At 2224, the second configural information is input to the second encoder to generate a fourth plurality of values (e.g., mean value and variance value not shown in FIG. 20). In some implementations, 2224 is performed automatically (e.g., without human intervention) in response to 2220.

At 2226, a first plurality of vectors (e.g., vector 232, vector 234) are generated based on the first plurality of values and the third plurality of values. In some implementations, 2226 is performed automatically (e.g., without human intervention) in response to 2214 and 2222.

At 2228, a second plurality of vectors (e.g., not shown in FIG. 20) are generated based on the second plurality of values and the fourth plurality of values. In some implementations, 2210 is performed automatically (e.g., without human intervention) in response to 2216 and 2224.

At 2230, a first vector (e.g., latent vector 236) is identified based on the first plurality of vectors. In some implementations, 2230 is performed automatically (e.g., without human intervention) in response to 2226.

At 2232, a second vector (e.g., not shown in FIG. 20) is identified based on the second plurality of vectors. In some implementations, 2232 is performed automatically (e.g., without human intervention) in response to 2228.

At 2234, a fourth image (e.g., image 240) showing the frontal view of the face of the user is generated by inputting the first vector to a decoder network that comprises a third fully connected neural network with a plurality of layers (e.g., decoder 238). In some implementations, 2234 is performed automatically (e.g., without human intervention) in response to 2230.

At 2236, a fifth image (e.g., not shown in FIG. 20) showing the front view of the face of the user is generated by inputting the second vector to the decoder network. In some implementations, 2236 is performed automatically (e.g., without human intervention) in response to 2232.

At 2238, a determination is made that a similarity between a first image (e.g., ground truth image 240) and fourth image is above a predetermined threshold. In some implementations, 2238 is performed automatically (e.g., without human intervention) in response to 2234.

At 2240, a determination is made that a similarity between the first image and the fifth image is above the predetermined threshold. In some implementations, 2240 is performed automatically (e.g., without human intervention) in response to 2236.

At 2242, in response to determining that (1) the similarity between the first image and the fourth image is above the predetermined threshold and (2) the similarity between the first image and the fifth image is above the predetermined threshold, the user request to access the secured resource is granted. In some implementations, 2242 is performed automatically (e.g., without human intervention) in response to 2238 and 2240.

In some implementations of method 2200, the generating the first plurality of CNN outputs at 2206 includes generating, based on the second image and using a first CNN from the plurality of CNNs, a first CNN output included in the plurality of CNN outputs. In some implementations of method 2200, the generating the first plurality of CNN outputs at 2206 further includes generating, based on the second image and using a second CNN from the plurality of CNNs, a second CNN output that is (1) different from the first CNN output, and (2) included in the plurality of CNN outputs. In some implementations of method 2200, the generating the first plurality of CNN outputs at 2206 further includes generating, based on the second image and using a third CNN from the plurality of CNNs, a third CNN output that is (1) different from the first CNN output and the second CNN output, and (2) included in the plurality of CNN outputs.

In some implementations of method 2200, the generating the first plurality of CNN outputs at 2206 includes modifying the second image, to generate a modified second image, by performing at least one of: landmark detection, alignment, or segmentation on the second image, the modified second image input to the plurality of CNNs to generate the first plurality of CNN outputs.

Some implementations of method 2200 further include capturing, using the camera, a sixth image that is different from the first image and shows the frontal view of the face of the user. Some implementations of method 2200 further include generating a third plurality of CNN outputs based on the sixth image and using the plurality of CNNs. Some implementations of method 2200 further include concatenating the CNN output from the third plurality of CNN outputs to generate a third concatenated CNN output. Some implementations of method 2200 further include inputting the third concatenated CNN output to the first encoder to generate a fifth plurality of values. Some implementations of method 2200 further include generating third configural information based on the sixth image, The third configural information indicates a third set of distances among facial landmarks from the set of facial landmarks of the face. Some implementations of method 2200 further include inputting the third configural information to the second encoder to generate a sixth plurality of values. Some implementations of method 2200 further include generating a third plurality of vectors based on the fifth plurality of values and the sixth plurality of values. Some implementations of method 2200 further include identifying a third vector based on the third plurality of vectors. Some implementations of method 2200 further include generating a seventh image showing the front view of the face of the user, by inputting the third vector to the decoder network. Some implementations of method 2200 further include determining that a similarity between the first image and the seventh image is above the predetermined threshold. The granting the user request to access the secured resource at 2242 is further in response to determining that the similarity between the first image and the seventh image is above the predetermined threshold.

In some implementations of method 2200, the set of landmarks includes an eye, an eyebrow, a nose, a mouth, and a chin. In some implementations of method 2200, the set of distances includes (1) a first distance that is between the eye and the eyebrow, (2) a second distance that is between the eye and the nose, (3) a third distance that is between the eye and the mouth, (4) a fourth distance that is between the eye and the chin, (5) a fifth distance that is between the eye and the eyebrow, (6) a sixth distance that is between the nose and the mouth, (7) a seventh distance that is between the eyebrow and the chin, and (8) an eighth distance that is between the nose and the eyebrow.

In some implementations of method 2200, the plurality of CNNs consists of three CNNs, and each CNN from the plurality of CNNs includes three layers.

In some implementations, method 2200 is performed by an apparatus that does not include a laser.

Figure 23:
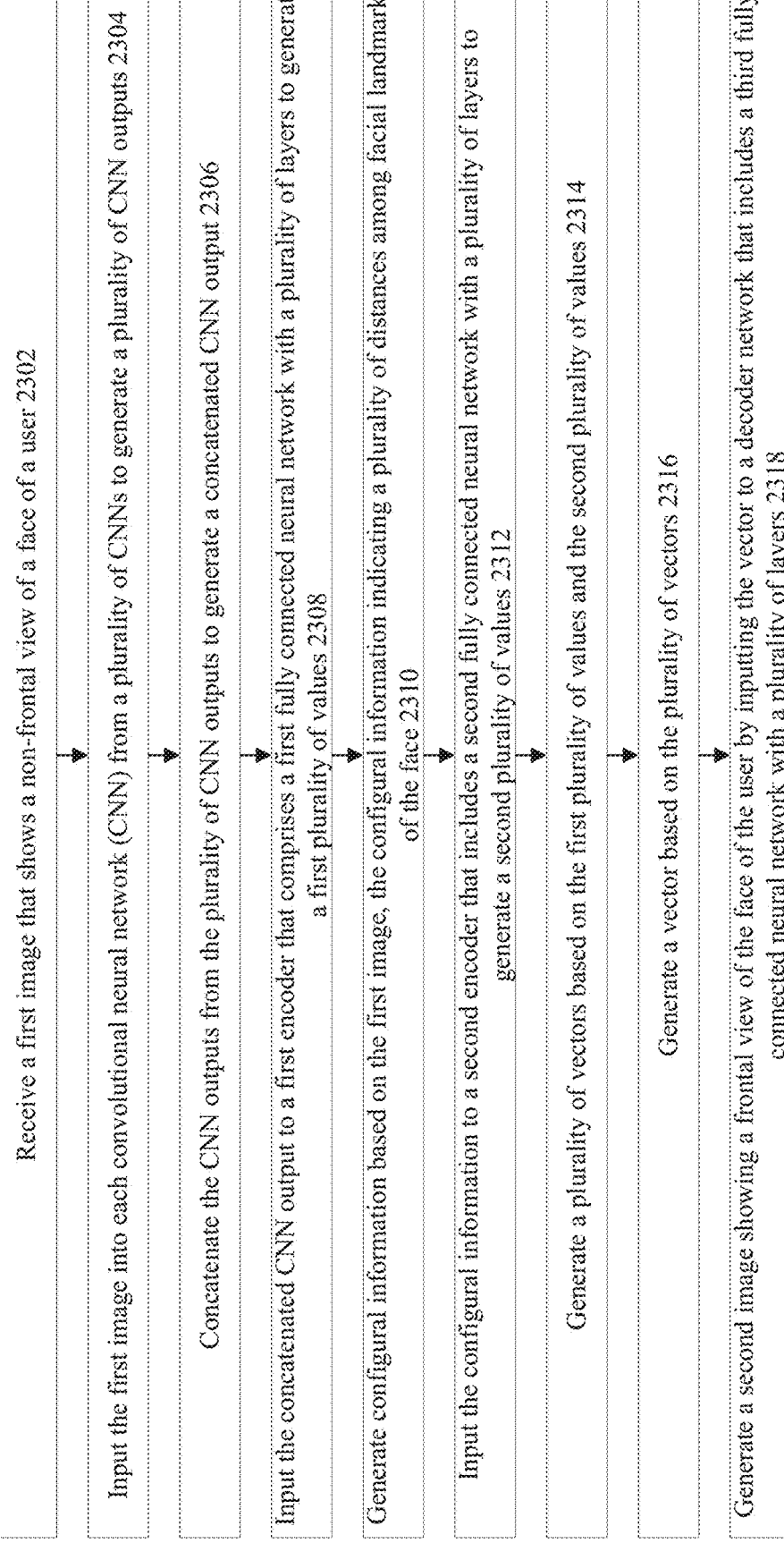
FIG. 23 shows a flowchart of a method for generating a frontal view image of a face using a non-frontal view image of the face, according to an embodiment.

FIG. 23 shows a flowchart of a method 2300 to generate a frontal view image of a face using a non-frontal view images of the face, according to an embodiment. In some implementations, method 2300 is performed by a processor (e.g., processor 202).

At 2302, a first image (e.g., image 208) that shows a non-frontal view of a face of a user is received. For example, the first image can be captured by a camera (e.g., camera 204) and a representation of the first image can be sent to a processor (e.g., processor 202).

At 2304, the first image is input into each convolutional neural network (CNN) from a plurality of CNNs (e.g., CNNs 210) to generate a plurality of CNN outputs (e.g., CNN outputs 212). In some implementations, 2304 is performed automatically (e.g., without human intervention) in response to 2302.

At 2306, the CNN outputs from the plurality of CNN outputs are concatenated to generate a concatenated CNN output (e.g., concatenated CNN output 214). In some implementations, 2306 is performed automatically (e.g., without human intervention) in response to 2304.

At 2308, the concatenated CNN output is input to a first encoder (e.g., encoder 216) that comprises a first fully connected neural network with a plurality of layers to generate a first plurality of values (e.g., mean value 218 and variance value 220). In some implementations, 2308 is performed automatically (e.g., without human intervention) in response to 2306.

At 2310, configural information (e.g., configural information 222) is generated based on the first image. The configural information indicates a plurality of distances among facial landmarks of the face. In some implementations, 2310 is performed automatically (e.g., without human intervention) in response to 2308.

At 2312, the configural information is input to a second encoder (e.g., encoder 226) that includes a second fully connected neural network with a plurality of layers to generate a second plurality of values (e.g., mean value 228 and variance value 230). In some implementations, 2312 is performed automatically (e.g., without human intervention) in response to 2310.

At 2314, a plurality of vectors (e.g., vector 232, vector 234) are generated based on the first plurality of values and the second plurality of values. In some implementations, 2304 is performed automatically (e.g., without human intervention) in response to 2308 and 2312.

At 2316, a vector (e.g., latent vector 236) is generated based on the plurality of vectors. In some implementations, 2316 is performed automatically (e.g., without human intervention) in response to 2314.

At 2318, a second image (e.g., image 240) showing a frontal view of the face of the user is generated by inputting the vector to a decoder network (e.g., decoder 238) that includes a third fully connected neural network with a plurality of layers. In some implementations, 2318 is performed automatically (e.g., without human intervention) in response to 2316.

In some implementations of method 2300, the first image is an image captured using a color camera (e.g., camera 204) and not using a laser.

In some implementations of method 2300, the plurality of CNNs consists of three CNNs and each CNN from the plurality of CNNs includes three layers.

In some implementations of method 2300, the CNNs from the plurality of CNNs operate in parallel without weight sharing during the inputting of the first image into the plurality of CNNs to generate the plurality of CNN outputs.

Figure 24:
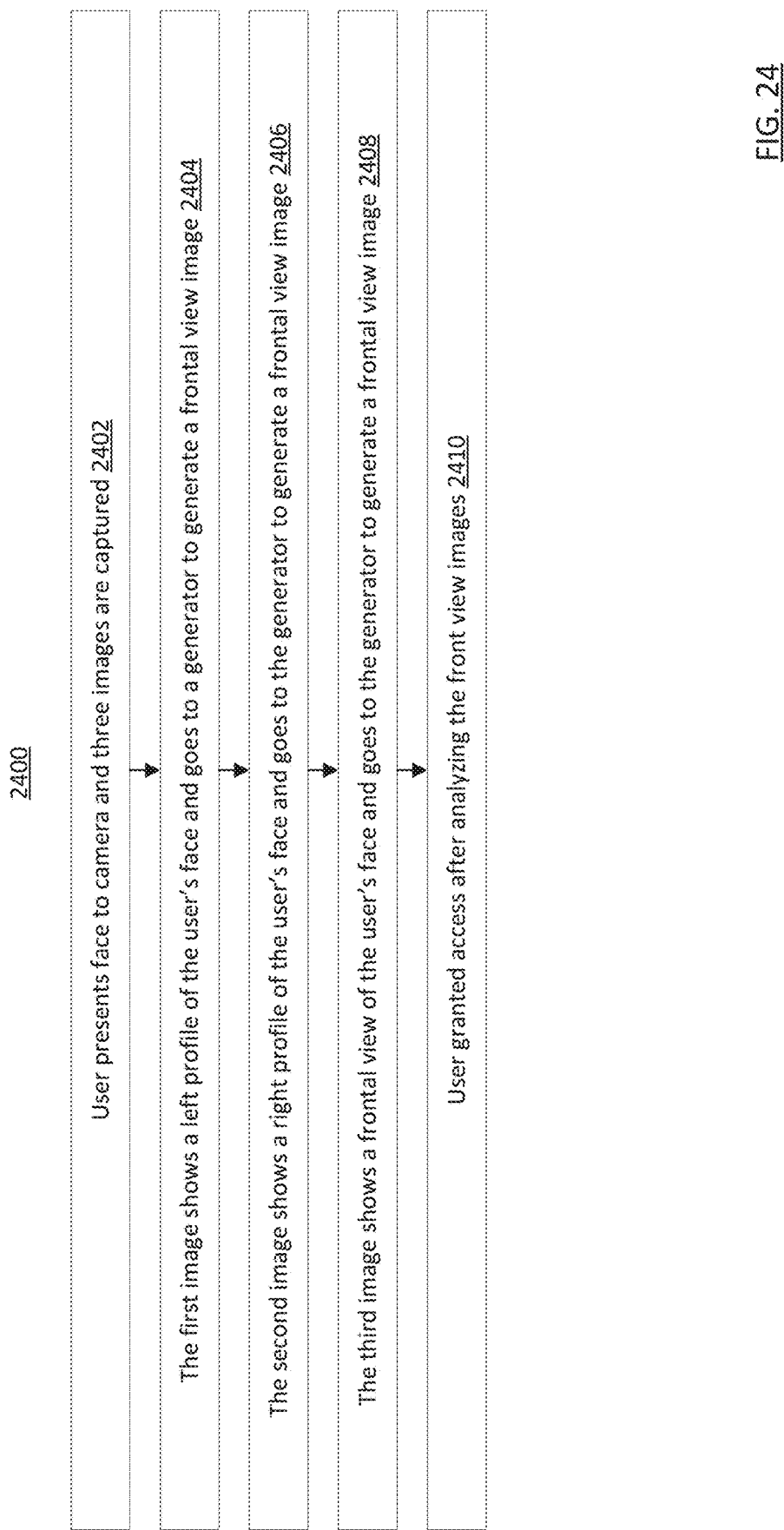
FIG. 24 shows a flowchart of a method 2400 to grant access to a user after analyzing three images of the user at three different profile, according to an embodiment.

FIG. 24 shows a flowchart of a method 2400 to grant access to a user after analyzing three images of the user at three different profile, according to an embodiment. At 2402, a user presents his face to a camera and three images are captured. For example, with reference to FIG. 20, camera 204 can capture a first image of the user that shows the user's face at a left profile, a second image that shows the user's face at a right profile, and a third image that shows the user's face at a frontal view. At 2404, the first image is input to a generator and a frontal view image is generated. At 2406, the second image is input to the generator and a frontal view image is generated. At 2408, the third image is input to the generator and a front view image is generated. The process for taking the first, second, and third image to generate the respective front view images can follow a process similar to the process described with respect to FIG. 20, where image 208 was used to generate image 240. At 2410, the three front view images are analyzed to confirm that the images are of the user (e.g., by comparing to a ground truth image that shows the user at a front view), and the user is granted access (e.g., to his phone, to a secure resource, etc.).

FIG. 25 shows a table comparing three convolution neural networks that can be used, according to an embodiment. Each of the three CNNs includes three layers. The three CNNs could make up, for example, CNNs 210 at FIG. 20 and/or CNNs 710 at FIG. 7.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a graphics processing unit (GPU), a controller, a microcontroller, a state machine and/or the like so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

[Various concepts may be embodied as one or more methods, of which at least one example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   receiving, at a processor, a first image showing a non-frontal view of a face of a user;
   inputting the first image into each convolutional neural network (CNN) from a plurality of CNNs, to generate a plurality of CNN outputs;
   concatenating the CNN outputs from the plurality of CNN outputs to generate a concatenated CNN output;
   inputting the concatenated CNN output to a first encoder that includes a first fully connected neural network with a plurality of layers, to generate a first value for a first statistical property and a first value for a second statistical property;
   generating, via the processor, configural information based on the first image, the configural information including an indication of a set of distances associated with a set of facial landmarks of the face;
   inputting the configural information to a second encoder that includes a second fully connected neural network with a plurality of layers, to generate a second value for the first statistical property and a second value for the second statistical property;
   generating a first vector based on the first value for the first statistical property and the second value for the first statistical property;
   generating, via the processor, a second vector based on the first value for the second statistical property and the second value for the second statistical property;
   generating, via the processor, a latent vector based on the first vector and the second vector; and
   inputting the latent vector to a decoder that includes a third plurality of fully connected neural networks, to generate a second image showing a frontal view of the face of the user.

2. The method of claim 1, wherein the non-frontal view includes one of a left profile view or a right profile view.

3. The method of claim 1, further comprising:
   determining a similarity between the second image and a third image that depicts the user; and
   granting access to a secured resource in response to determining that the similarity is greater than a predetermined threshold.

4. The method of claim 1, further comprising:
   receiving, at the processor, a preliminary image that shows the face of the user; and
   processing the preliminary image to generate the first image by performing at least one of landmark detection, alignment, or segmentation on the preliminary image.

5. The method of claim 1, wherein the set of landmarks includes an eye, an eyebrow, a nose, a mouth, and a chin.

6. The method of claim 5, wherein the set of distances includes at least one of: (1) a first distance that is between the eye and the eyebrow, (2) a second distance that is between the eye and the nose, (3) a third distance that is between the eye and the mouth, (4) a fourth distance that is between the eye and the chin, (5) a fifth distance that is between the eye and the eyebrow, (6) a sixth distance that is between the nose and the mouth, (7) a seventh distance that is between the eyebrow and the chin, or (8) an eighth distance that is between the nose and the eyebrow.

7. The method of claim 1, wherein the plurality of CNNs includes three CNNs running in parallel without weight sharing.

8. The method of claim 1, wherein each CNN from the plurality of CNNs uses at least one of a kernel size or a filter size that is different from a kernel size or a filter size of the remaining CNNs from the plurality of CNNs.

9. The method of claim 1, wherein each CNN from the plurality of CNNs includes three layers.

10. The method of claim 9, wherein the three layers are a convolution layer followed by a pooling layer followed by an activation function layer.

11. A system, comprising:
    a memory having access to a representation of a first image showing a frontal view of a face of a user;
    a camera operatively coupled to the memory; and
    a processor operatively coupled to the memory and the camera, the processor configured to:
      receive a user request to access a secured resource;
      capture, using the camera, a second image that shows a first non-frontal view of the face of the user and a third image that shows a second non-frontal view of the face of the user different from the first non-frontal view;
      generate a first plurality of convolutional neural network (CNN) outputs based on the second image and using a plurality of CNNs;
      generate a second plurality of CNN outputs based on the third image and using the plurality of CNNs;
      concatenate the CNN outputs from the first plurality of CNN outputs, to generate a first concatenated CNN output;
      concatenate the CNN outputs from the second plurality of CNN outputs, to generate a second concatenated CNN output;
      input the first concatenated CNN output to a first encoder that includes a first fully connected neural network with a plurality of layers to generate a first plurality of values;
      input the second concatenated CNN output to the first encoder to generate a second plurality of values;
      generate first configural information based on the second image, the first configural information indicating a first set of distances among facial landmarks from a set of facial landmarks of the face;

generate second configural information based on the third image, the second configural information indicating a second set of distances among facial landmarks from the set of facial landmarks of the face;
input the first configural information to a second encoder that includes a second fully connected neural network with a plurality of layers to generate a third plurality of values;
input the second configural information to the second encoder to generate a fourth plurality of values;
generate a first plurality of vectors based on the first plurality of values and the third plurality of values;
generate a second plurality of vectors based on the second plurality of values and the fourth plurality of values;
identify a first vector based on the first plurality of vectors;
identify a second vector based on the second plurality of vectors;
generate a fourth image showing the frontal view of the face of the user, by inputting the first vector to a decoder network that includes a third fully connected neural network with a plurality of layers;
generate a fifth image showing the frontal view of the face of the user, by inputting the second vector to the decoder network;
determine that a similarity between the first image and fourth image is above a predetermined threshold;
determine that a similarity between the first image and the fifth image is above the predetermined threshold; and
in response to determining that (1) the similarity between the first image and the fourth image is above the predetermined threshold and (2) the similarity between the first image and the fifth image is above the predetermined threshold, grant the user request to access the secured resource.

12. The apparatus of claim 11, wherein the generating the first plurality of CNN outputs includes:
generating, based on the second image and using a first CNN from the plurality of CNNs, a first CNN output included in the plurality of CNN outputs;
generating, based on the second image and using a second CNN from the plurality of CNNs, a second CNN output that is (1) different from the first CNN output, and (2) included in the plurality of CNN outputs; and
generating, based on the second image and using a third CNN from the plurality of CNNs, a third CNN output that is (1) different from the first CNN output and the second CNN output, and (2) included in the plurality of CNN outputs.

13. The apparatus of claim 11, wherein the processor is configured to generate the first plurality of CNN outputs by:
modifying the second image, to generate a modified second image, by performing at least one of: landmark detection, alignment, or segmentation on the second image, the modified second image input to the plurality of CNNs to generate the first plurality of CNN outputs.

14. The apparatus of claim 11, wherein the processor is further configured to:
capture, using the camera, a sixth image that is different from the first image and that shows the frontal view of the face of the user;
generate a third plurality of CNN outputs based on the sixth image and using the plurality of CNNs;
concatenate the CNN output from the third plurality of CNN outputs to generate a third concatenated CNN output;
input the third concatenated CNN output to the first encoder to generate a fifth plurality of values;
generate third configural information based on the sixth image, the third configural information indicating a third set of distances among facial landmarks from the set of facial landmarks of the face;
input the third configural information to the second encoder to generate a sixth plurality of values;
generate a third plurality of vectors based on the fifth plurality of values and the sixth plurality of values;
identify a third vector based on the third plurality of vectors;
generate a seventh image showing the frontal view of the face of the user, by inputting the third vector to the decoder network; and
determine that a similarity between the first image and the seventh image is above the predetermined threshold,
the processor configured to grant the user request to access the secured resource further in response to determining that the similarity between the first image and the seventh image is above the predetermined threshold.

15. The apparatus of claim 11, wherein:
the set of landmarks includes an eye, an eyebrow, a nose, a mouth, and a chin; and
the set of distances includes at least one of: (1) a first distance that is between the eye and the eyebrow, (2) a second distance that is between the eye and the nose, (3) a third distance that is between the eye and the mouth, (4) a fourth distance that is between the eye and the chin, (5) a fifth distance that is between the eye and the eyebrow, (6) a sixth distance that is between the nose and the mouth, (7) a seventh distance that is between the eyebrow and the chin, or (8) an eighth distance that is between the nose and the eyebrow.

16. The apparatus of claim 11, wherein the plurality of CNNs consists of three CNNs, and each CNN from the plurality of CNNs includes three layers.

17. The apparatus of claim 11, wherein the apparatus does not include a laser.

18. A non-transitory, processor-readable medium storing code representing instructions executable by a processor, the code comprising code to cause the processor to:
receive a first image that shows a non-frontal view of a face of a user;
input the first image into each convolutional neural network (CNN) from a plurality of CNNs to generate a plurality of CNN outputs;
concatenate the CNN outputs from the plurality of CNN outputs to generate a concatenated CNN output;
input the concatenated CNN output to a first encoder that includes a first fully connected neural network with a plurality of layers to generate a first plurality of values;
generate configural information based on the first image, the configural information indicating a plurality of distances among facial landmarks of the face;
input the configural information to a second encoder that includes a second fully connected neural network with a plurality of layers to generate a second plurality of values;
generate a plurality of vectors based on the first plurality of values and the second plurality of values;

generate a vector based on the plurality of vectors; and
generate a second image showing a frontal view of the face of the user by inputting the vector to a decoder network that includes a third fully connected neural network with a plurality of layers.

19. The non-transitory processor-readable medium of claim 18, wherein the first image is an image captured using a color camera and not using a laser.

20. The non-transitory processor-readable medium of claim 18, wherein the plurality of CNNs consists of three CNNs, and each CNN from the plurality of CNNs includes three layers.

21. The non-transitory processor-readable medium of claim 18, wherein the CNNs from the plurality of CNNs operate in parallel without weight sharing during the inputting of the first image into the plurality of CNNs to generate the plurality of CNN outputs.

* * * * *